(12) United States Patent
Takahashi et al.

(10) Patent No.: US 9,223,140 B2
(45) Date of Patent: Dec. 29, 2015

(54) COUPLING LENS, ILLUMINATING DEVICE, AND ELECTRONIC DEVICE

(75) Inventors: Yoshitaka Takahashi, Noda (JP); Hiroshi Akiyama, Yokohama (JP)

(73) Assignee: RICOH COMPANY, LTD., Tokyo (JP)

( * ) Notice: Subject to any disclaimer, the term of this patent is extended or adjusted under 35 U.S.C. 154(b) by 918 days.

(21) Appl. No.: 13/140,732

(22) PCT Filed: Dec. 15, 2009

(86) PCT No.: PCT/JP2009/071195
§ 371 (c)(1), (2), (4) Date: Jun. 17, 2011

(87) PCT Pub. No.: WO2010/071215
PCT Pub. Date: Jun. 24, 2010

(65) Prior Publication Data
US 2011/0249240 A1 Oct. 13, 2011

(30) Foreign Application Priority Data
Dec. 17, 2008 (JP) ................................. 2008-321135

(51) Int. Cl.
*G02B 27/09* (2006.01)
*G02B 3/10* (2006.01)
(Continued)

(52) U.S. Cl.
CPC .............. *G02B 27/0905* (2013.01); *G02B 3/10* (2013.01); *G02B 27/104* (2013.01); *G02B 27/145* (2013.01); *G02B 27/148* (2013.01)

(58) Field of Classification Search
CPC ......... G03B 21/24; G03B 21/14; G03B 21/10
USPC ..................................... 353/81; 359/454, 619
See application file for complete search history.

(56) References Cited

U.S. PATENT DOCUMENTS 5,280,161 A 1/1994 Niwa
5,568,315 A 10/1996 Shuman
(Continued)

FOREIGN PATENT DOCUMENTS

CN 1652015 A 8/2005
JP 10 170864 6/1998
(Continued)

OTHER PUBLICATIONS

International Search Report issued Mar. 2, 2010 in PCT/JP09/71195 filed Dec. 15, 2009.
(Continued)

*Primary Examiner* — William C Dowling
*Assistant Examiner* — Jerry Brooks
(74) *Attorney, Agent, or Firm* — Oblon, McClelland, Maier & Neustadt, L.L.P.

(57) ABSTRACT

A coupling lens for coupling first light having a first wavelength from a first light source with a second light having a second wavelength from a second light source disposed adjacent to the first light source in substantially the same direction includes a first surface disposed to face the first and second light sources, the first surface including a first region transmitting the first light and having a first region curvature and a second region transmitting the second light and having a second region curvature, and a second surface opposite to the first surface and having a second-surface curvature. A position of a center of the first region curvature differs from a position of a center of the second region curvature. A center of the second surface curvature and the center of the first region curvature are disposed on an optical axis of the first or second light source.

18 Claims, 15 Drawing Sheets

(51) Int. Cl.
*G02B 27/10* (2006.01)
*G02B 27/14* (2006.01)

(56) References Cited

U.S. PATENT DOCUMENTS

| | | | |
|---|---|---|---|
| 5,704,700 A * | 1/1998 | Kappel et al. | 353/31 |
| 5,739,875 A * | 4/1998 | Toide et al. | 348/744 |
| 5,973,846 A * | 10/1999 | McConica | 359/642 |
| 6,186,629 B1 * | 2/2001 | Iwamura et al. | 353/31 |
| 6,283,615 B1 | 9/2001 | Takahashi | |
| 6,430,140 B1 | 8/2002 | Shimano et al. | |
| 7,082,236 B1 * | 7/2006 | Moore | 385/33 |
| 2004/0247011 A1 | 12/2004 | Okazaki et al. | |
| 2005/0168822 A1 | 8/2005 | Uchikawa et al. | |
| 2006/0092814 A1 * | 5/2006 | Jeong et al. | 369/112.02 |
| 2006/0138239 A1 * | 6/2006 | Sonoda et al. | 235/462.38 |
| 2006/0170884 A1 | 8/2006 | Liu | |
| 2006/0203364 A1 * | 9/2006 | Nuebling | 359/872 |
| 2006/0290903 A1 | 12/2006 | Inoko et al. | |
| 2010/0033685 A1 | 2/2010 | Seo et al. | |
| 2011/0128602 A1 | 6/2011 | Hamano et al. | |

FOREIGN PATENT DOCUMENTS

| | | |
|---|---|---|
| JP | 2001 154607 | 6/2001 |
| JP | 3 298 433 | 4/2002 |
| JP | 2002 207110 | 7/2002 |
| JP | 2004 341107 | 12/2004 |
| JP | 2004 341108 | 12/2004 |
| JP | 2006 189573 | 7/2006 |
| JP | 2008 26793 | 2/2008 |
| JP | 2010 40443 | 2/2010 |
| JP | 2010 049232 | 3/2010 |
| RU | 2 137 978 C1 | 9/1999 |
| TW | 2006-00869 A | 1/2006 |
| WO | WO 99/50596 A2 | 10/1999 |

OTHER PUBLICATIONS

Combined Office Action and Search Report issued Sep. 25, 2013 in Taiwanese Patent Application No. 098143137 (with English-language translation).

Russian Notice of Decision to Grant Issued Aug. 28, 2012 in Patent Application No. 2011129631 (with English translation).

Extended European Search Report issued Dec. 8, 2014 in Patent Application No. 09833517.7.

Chinese Office Action issued Nov. 14, 2012, in China Patent Application No. 200980151843.9 (with English translation).

* cited by examiner

COUPLING LENS, ILLUMINATING DEVICE, AND ELECTRONIC DEVICE

This application is based on and claims priority from Japanese Patent Application No. 2008-321135, filed on Dec. 17, 2008, the disclosure of which is incorporated herein by reference in its entirety.

TECHNICAL FIELD

The present invention relates to an illuminating device configured to combine light modulated and emitted from a plurality of light sources and to emit the combined light in one direction. The present invention also relates to a coupling lens used in the illuminating device, a projection type image display apparatus such as a laser scanning type projector, and the like, having the illuminating device, and an electronic device such as a mobile phone and the like, where the projection type image display apparatus is disposed.

BACKGROUND ART

Recently, a projection type image display apparatus (hereinafter, referred to as a projector) using an LED, a laser, or the like has been developed, and a small size portable projector is expected.

In particular, a small size scanning type projector combining lasers of three primary colors and a MEMS (Micro Electro Mechanical Systems) mirror has been developed because it requires fewer parts or components and the possibility of microminiaturization (see, for example, Japanese Patent Number 4031481).

FIG. 22 shows such a conventional scanning type projector having the three primary color lasers and the MEMS mirror. The projector shown in FIG. 22 has semiconductor lasers 1-R, 1-G, and 1-B configured to emit laser light of red R, green G, and blue B, respectively, lenses 2-R, 2-G, and 2-B configured to focus the laser light emitted from the semiconductor lasers 1-R, 1-G, and 1-B, respectively, dichroic mirrors 3-R, 3-G, and 3-B configured to reflect only red light, green light, and blue light and transmit light of the other colors, respectively, a MEMS mirror device 501 having a mirror configured to have a variable inclined angle, and a control device 502 configured to allow the mirror of the MEMS mirror device 501 to be rotated or turned in horizontal and vertical directions and to allow the semiconductor lasers 1-R, 1-G, and 1-B to emit laser light which has a light intensity modulated according to input video signals.

The control device 502 has a mirror control section and a modulating section and an image is formed on a screen 503 by modulating laser light intensity in synchronism with the angle of the MEMS mirror device 501.

In such a method of combining color light, the focusing lens is necessary for each laser so that the number of parts and components is increased and a small size and lightweight device cannot be achieved.

FIG. 23 shows an example where light fluxes from three color light sources of red, green, and blue 601R, 601G, and 601B are combined by a dichroic prism 602 and focused by a focusing lens 603 (see, for example, Japanese Patent Application Publication Number 2001-154607).

In such a configuration, although only one focusing lens is used, the light sources are arranged such that the emitting directions of the light sources are different from each other so that there is a disadvantage in achieving a small size and lightweight device.

FIG. 24 shows an example where light fluxes from two light sources are emitted in the substantially same direction and coupled by one coupling lens and combined and emitted on one light path via a two-beam combining prism, and therefore light from a plurality of light sources is combined and emitted on one light path.

This example relates to a pickup optical system of an optical disk, and a semiconductor laser 1011 of a wavelength of 660 nm and a semiconductor laser 1012 of a wavelength of 780 nm are changed into substantially parallel light fluxes by a collimating lens 1020 and a two beam combining prism 1031 is configured to match optical axes of the light flux of 660 nm and the light flux of 780 nm with each other, to enter an objective lens.

For the collimating lens used for the light pickup of the optical disk, in order to focus narrowly the light on a spot of a recording surface of the optical disk (1061, 1062) without variation, it is required to ensure a sufficient intensity in a distribution of light intensity of the light entering an edge of the objective lens 1050 in relation to a peak intensity of the laser light source so that the focal length of the collimating lens cannot be reduced.

When the focal length of the collimating lens is large (about 10 mm or more), an efficiency of coupling the light from the light source is decreased and the light use efficiency is reduced.

Furthermore, the large size of the apparatus cannot be prevented because of the large focal length. If the focal length of the collimating lens is set to be small, it is difficult to remove astigmatism generated in the light reflected on a rear surface of the two beam combining prism under practical conditions such as an interval between the two light sources, and thickness of the two beam combining prism. Accordingly, it is difficult to combine light fluxes from the two light sources by one collimating lens of small focal length. Conventional technology is also described in Japanese Patent Application Publication Number 2002-207110.

As described above, it is difficult, by use of one collimating lens of a small focal length, to combine light fluxes from a plurality of light sources with good wave front onto one light path via a two beam combining prism by allowing the two light sources to emit light fluxes in the substantially same directions and allowing one coupling lens to couple the light fluxes, as described in the conventional technology.

SUMMARY OF INVENTION

The present invention is mainly to provide an illuminating device for achieving a small size device and improvement of light use efficiency and for improving a wave front quality of light fluxes.

In order to achieve the above objects, a coupling lens according to an embodiment of the present invention is for coupling first light having a first wavelength, which is emitted from a first light source with a second light having a second wavelength which is emitted from a second light source disposed adjacent to the first light source, the first and second light being emitted in substantially the same direction. The coupling lens includes a first surface disposed so as to face the first and second light sources, the first surface including a first region through which the first light passes and a second region through which the second light passes, the first region having a first region curvature and the second region having a second region curvature, and a second surface disposed at an opposite side of the first surface and having a second-surface curvature. A position of a first region curvature center of the first region curvature of the first region differs from a position of a second region curvature center of the second region curvature of the second region. A second surface curvature center of the second surface curvature of the second surface and the first region curvature center are disposed on an optical axis of the first or second light source.

Figure 2A:
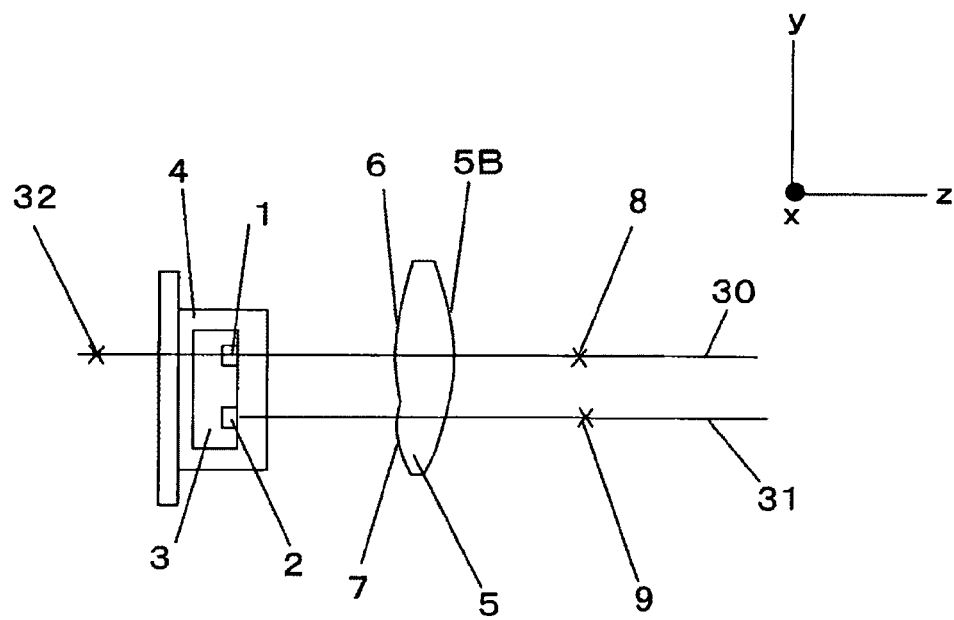
Figure 2B:
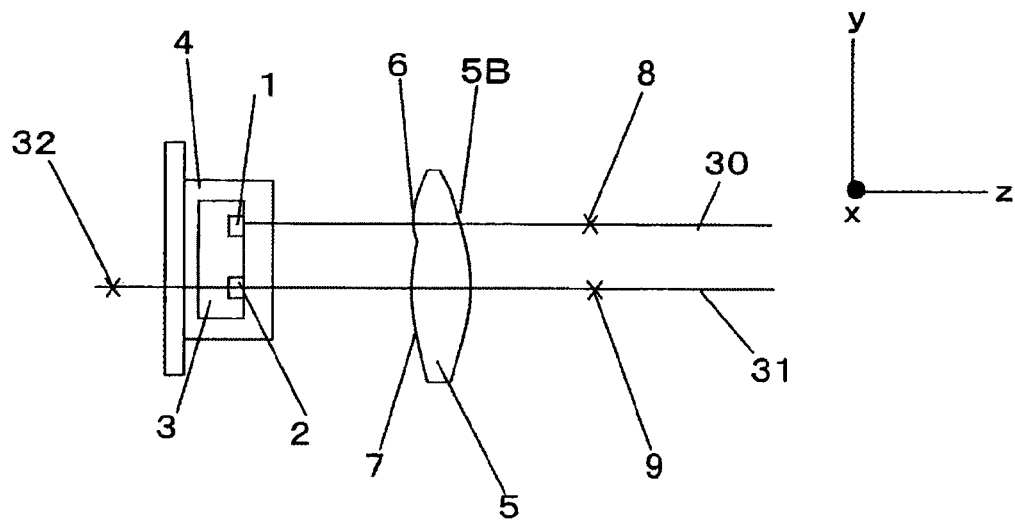

Each of FIGS. 2A and 2B is a view showing a positional relationship between curvature centers of a first and second surface of a coupling lens.

Figure 3:
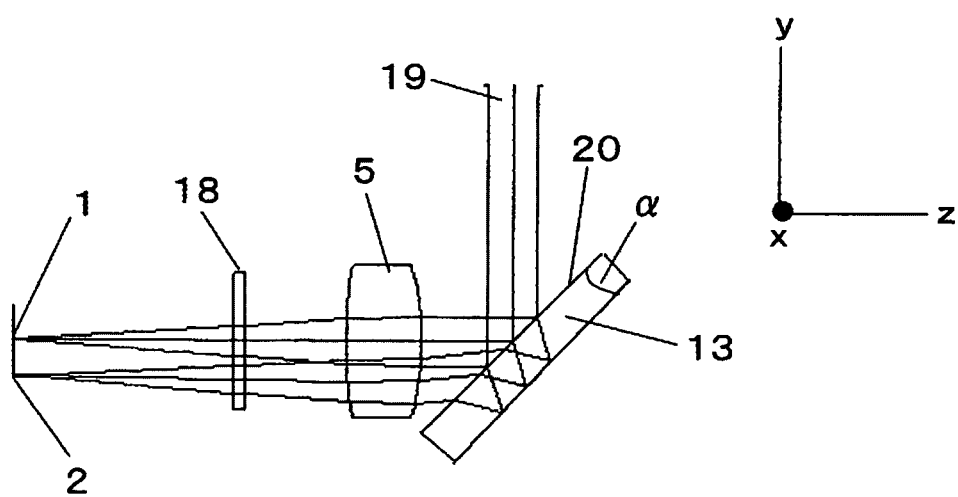

FIG. 3 is a view showing an optical system using a conventional coupling lens.

Figure 4:
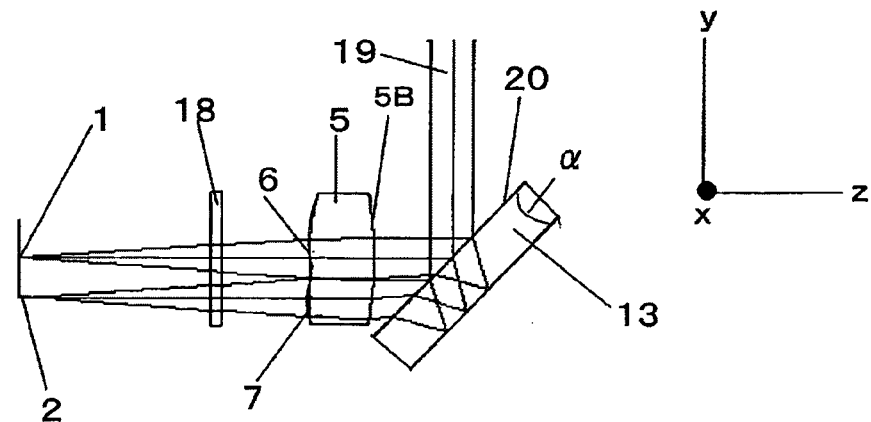

FIG. 4 is a view showing an optical system using a coupling lens according to an embodiment of the present invention.

Figure 5:
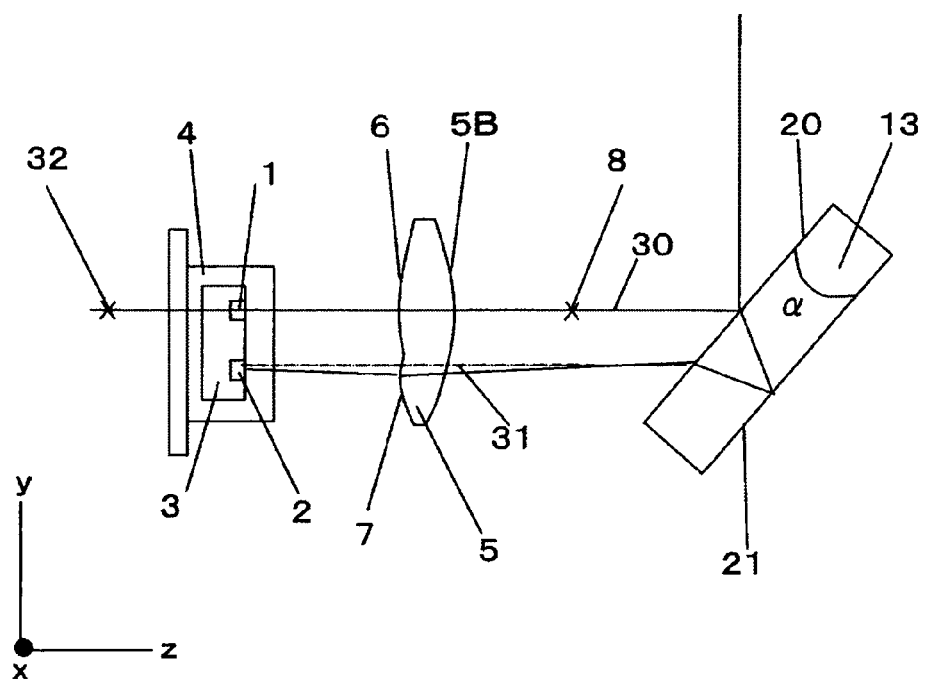

FIG. 5 is a schematic view showing a configuration of an illuminating device according to a second embodiment of the present invention.

Figure 6:
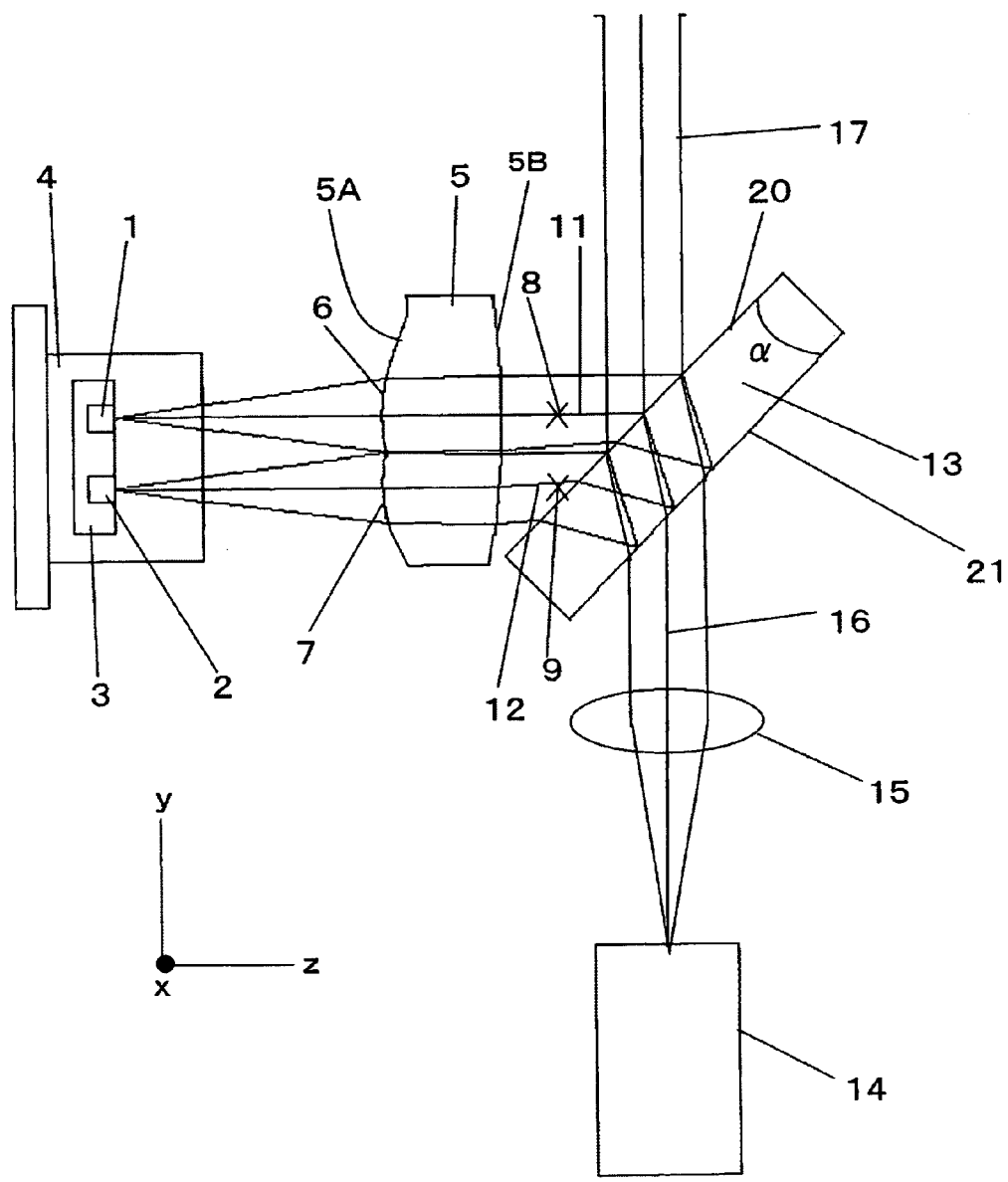

FIG. 6 is a schematic view showing a configuration of an illuminating device according to a third embodiment of the present invention.

Figure 7:
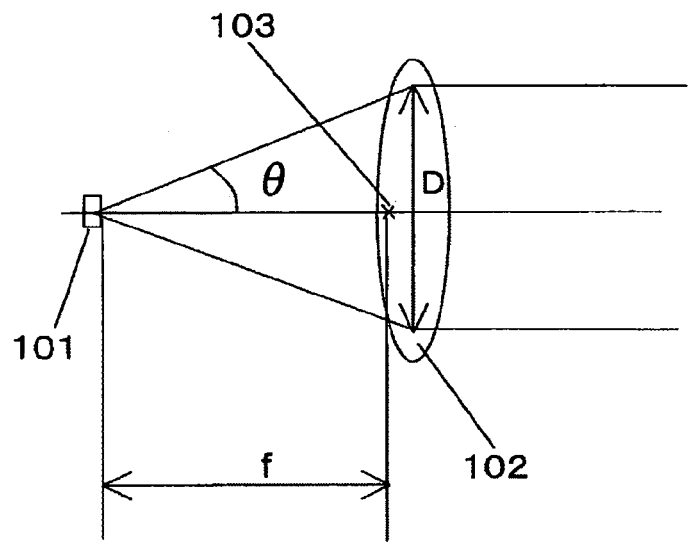

FIG. 7 is an explanatory view showing a numeric aperture of the coupling lens in a fourth embodiment of the present invention.

Figure 8:
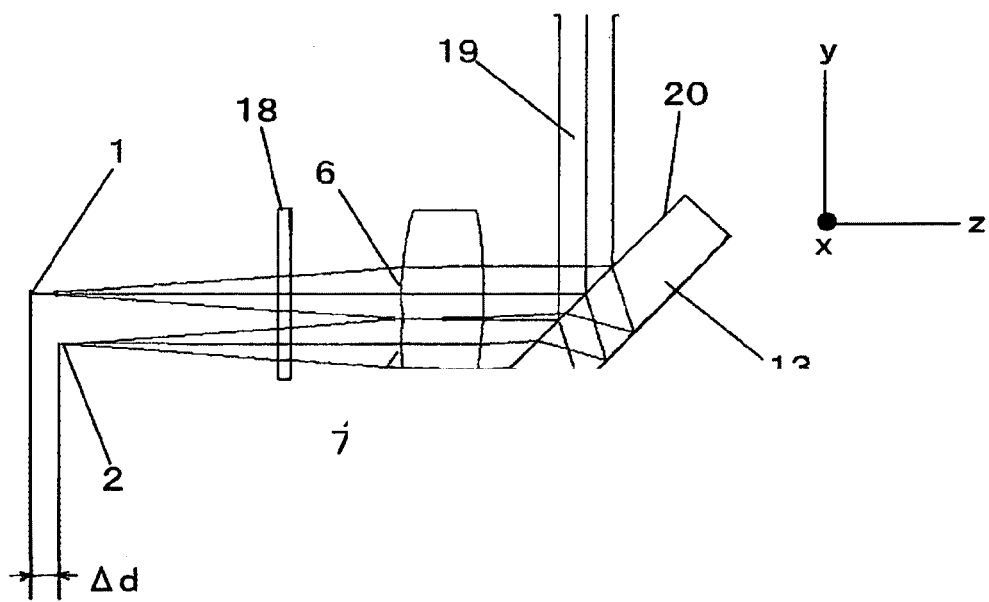

FIG. 8 is a schematic view showing a configuration of an illuminating device according to a fifth embodiment of the present invention.

Figure 9A:
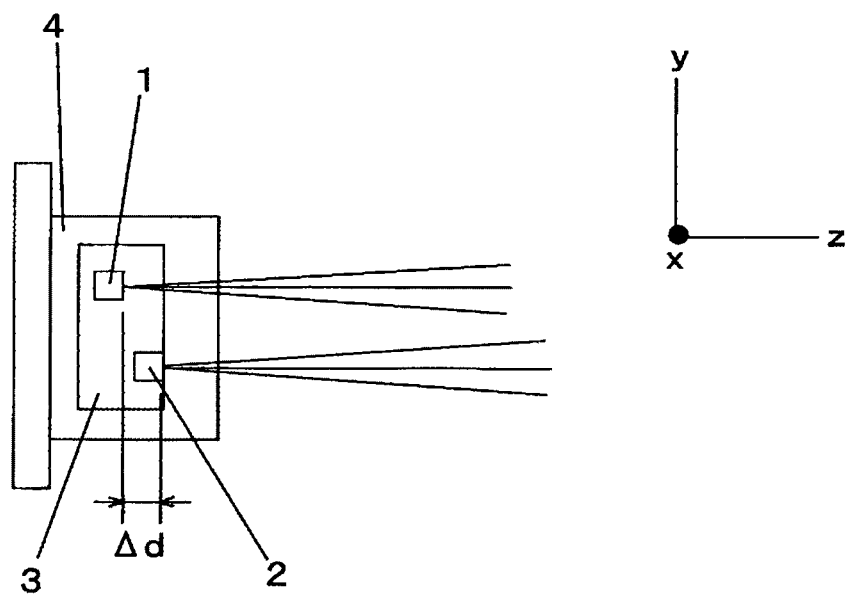
Figure 9B:
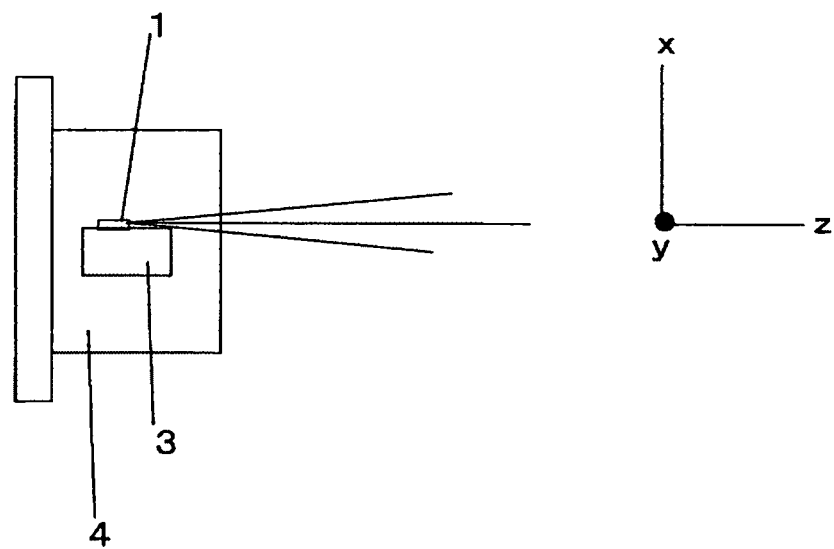

FIGS. 9A and 9B are views showing an arrangement state of the light sources from a viewpoint of heat releasing.

Figure 10:
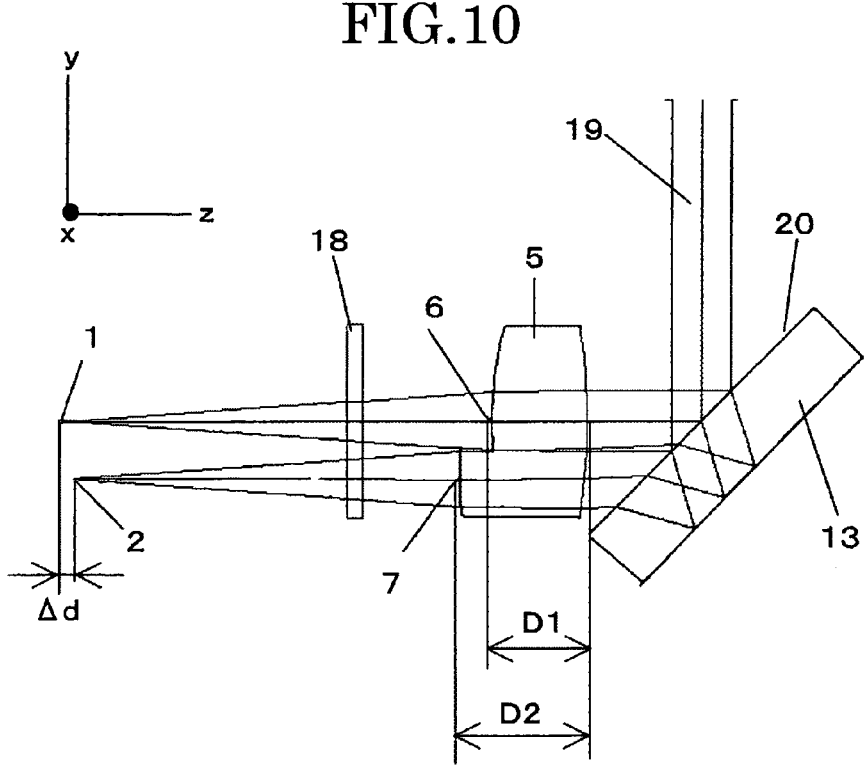

FIG. 10 is a schematic view showing a configuration of an illuminating device based on a design in a case where first and second regions have different focal length from each other.

Figure 11:
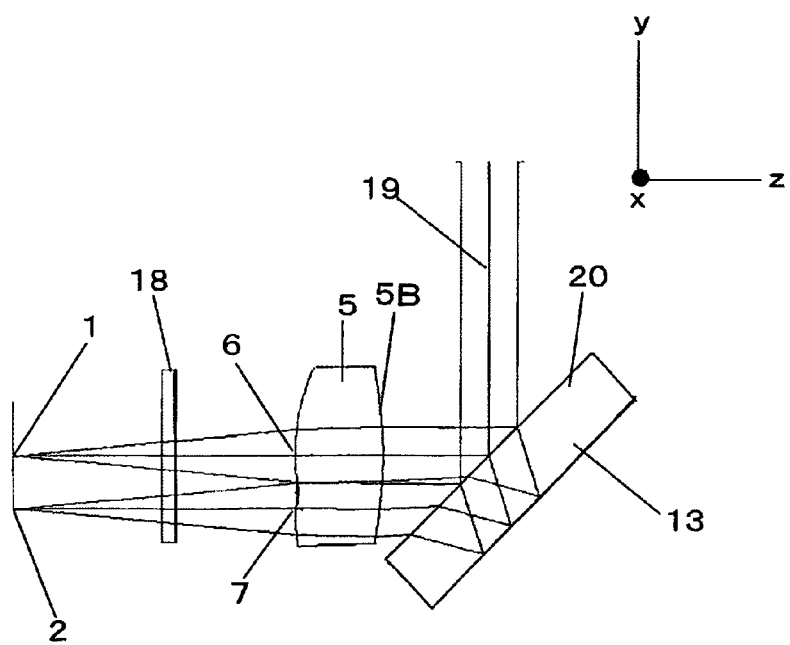

FIG. 11 is a schematic view showing a configuration of an illuminating device according to a seventh embodiment of the present invention.

Figure 12:
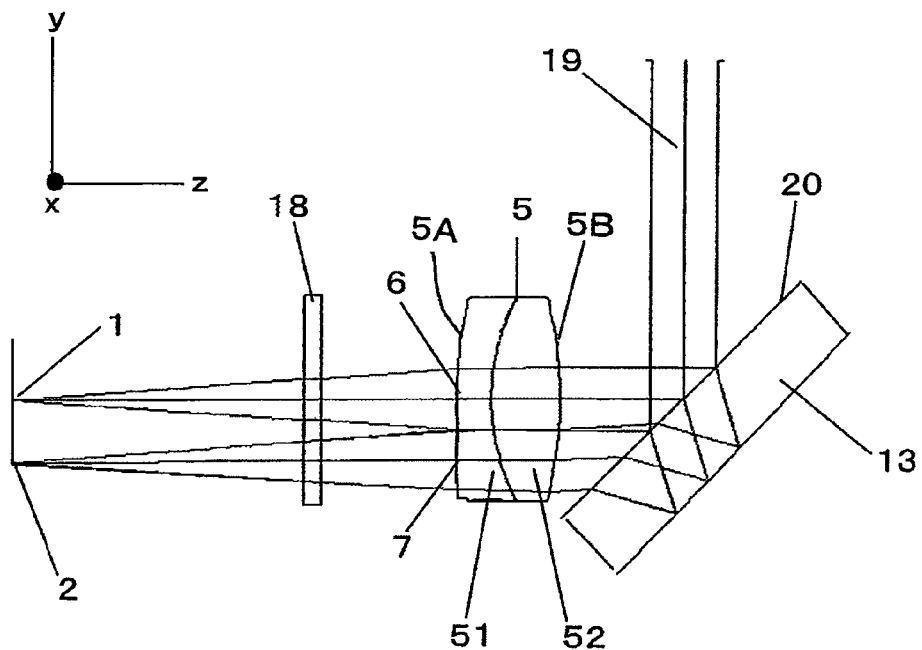

FIG. 12 is a schematic view showing a configuration of an illuminating device according to a ninth embodiment of the present invention.

Figure 13:
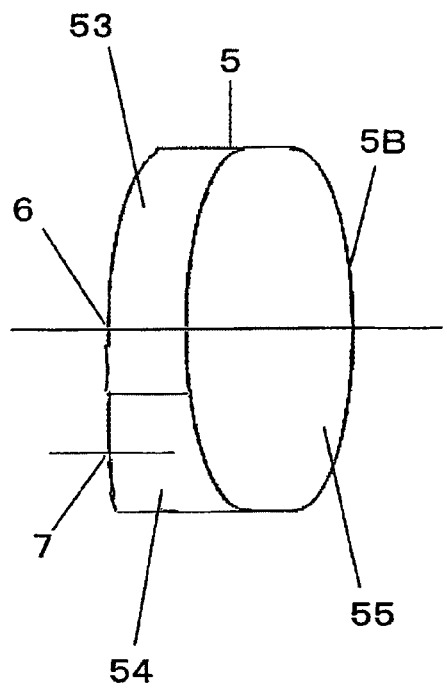

FIG. 13 is a schematic view showing a configuration of a coupling lens according to a tenth embodiment of the present invention.

Figure 14:
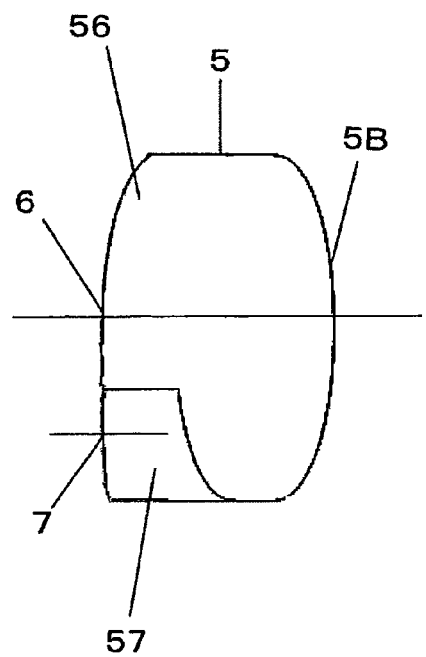

FIG. 14 is a schematic view showing another configuration of the coupling lens according to the tenth embodiment of the present invention.

Figure 15:
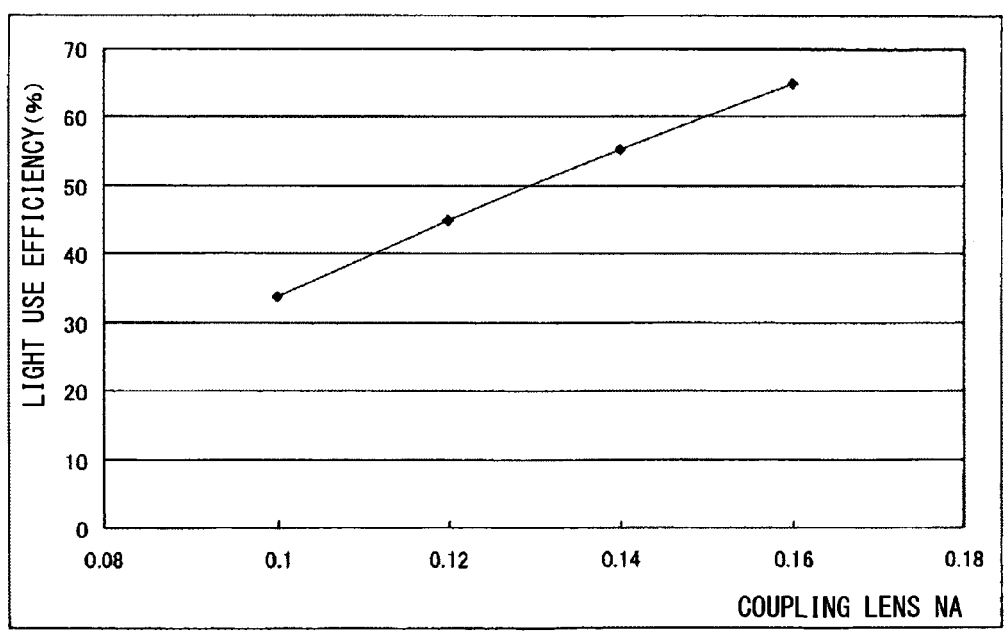

FIG. 15 is a view showing a relationship between an NA of the coupling lens and a coupling efficiency.

Figure 16:
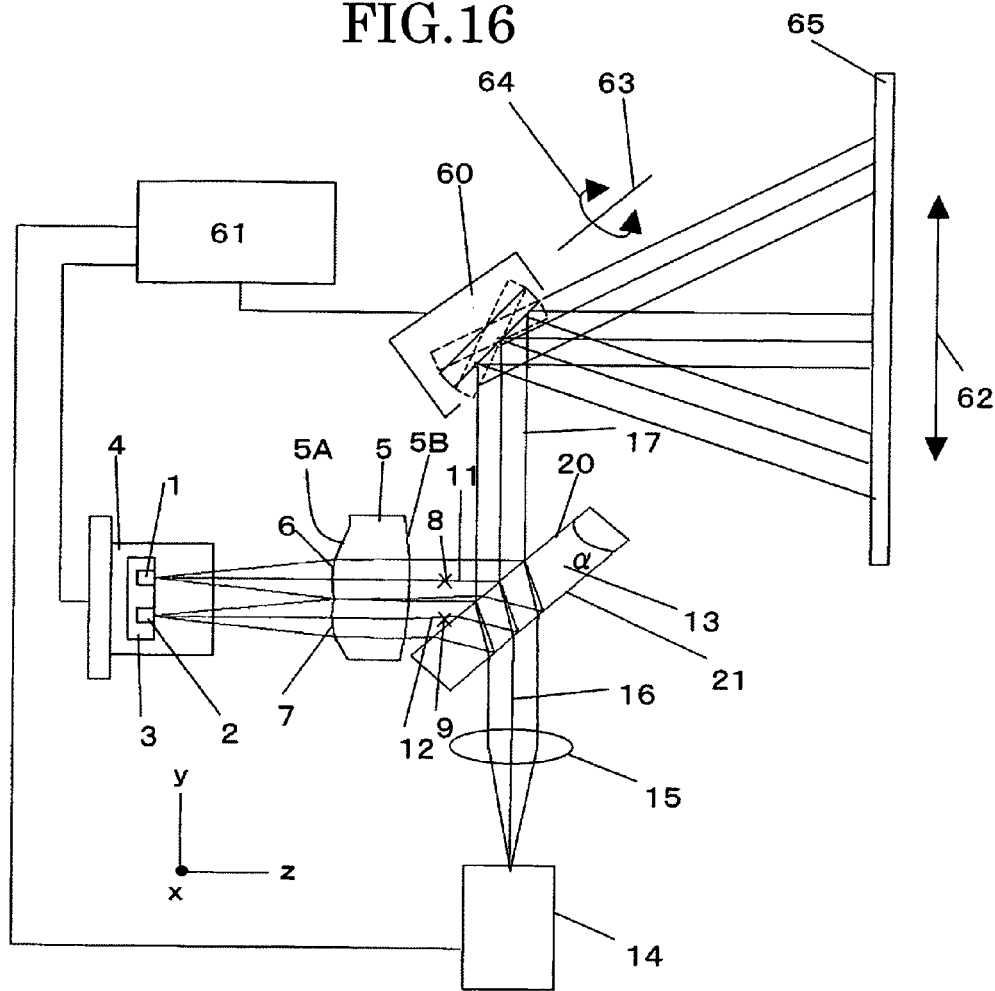

FIG. 16 is a schematic view showing a configuration of a projection type image display apparatus according to a twelfth embodiment of the present invention.

Figure 17:
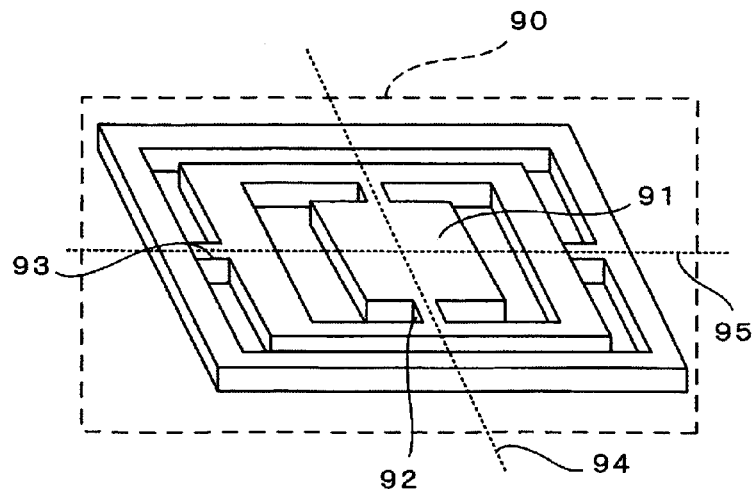

FIG. 17 is a perspective view showing a configuration of a MEMS mirror as a scanning device.

Figure 18:
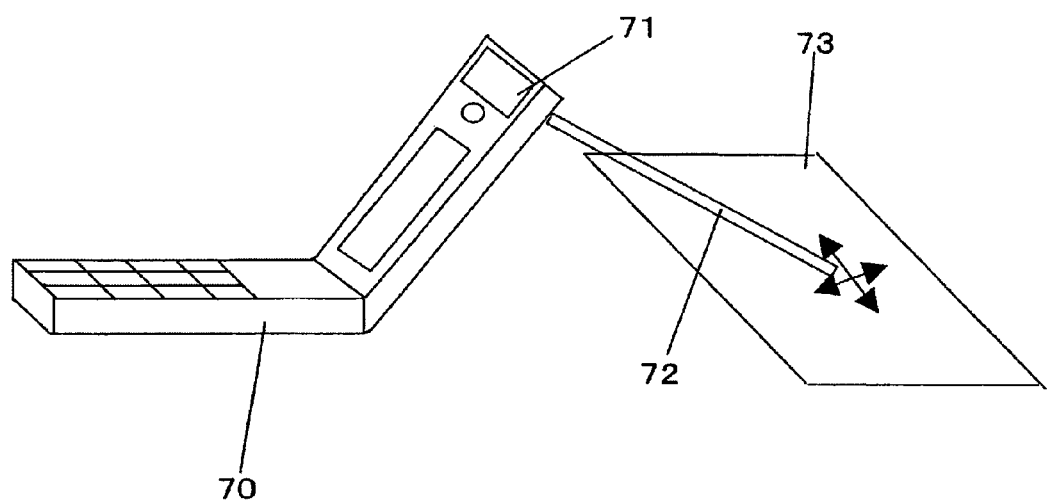

FIG. 18 is a perspective view showing a used state of a mobile phone as an electronic device where a projection type image display apparatus according to a thirteenth embodiment of the present invention is disposed.

Figure 19:
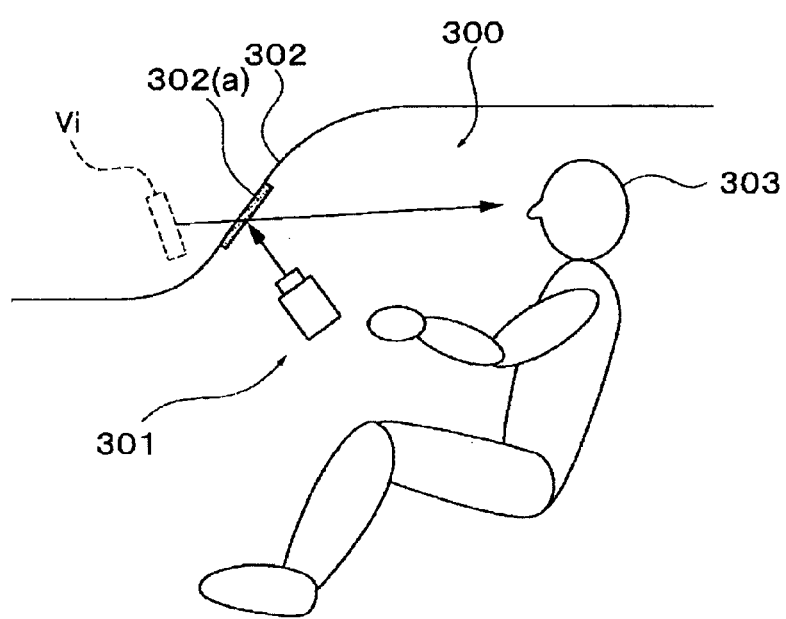

FIG. 19 is a schematic view showing a configuration in a case where the projection type image display apparatus is used as a head up display for a vehicle.

Figure 20:
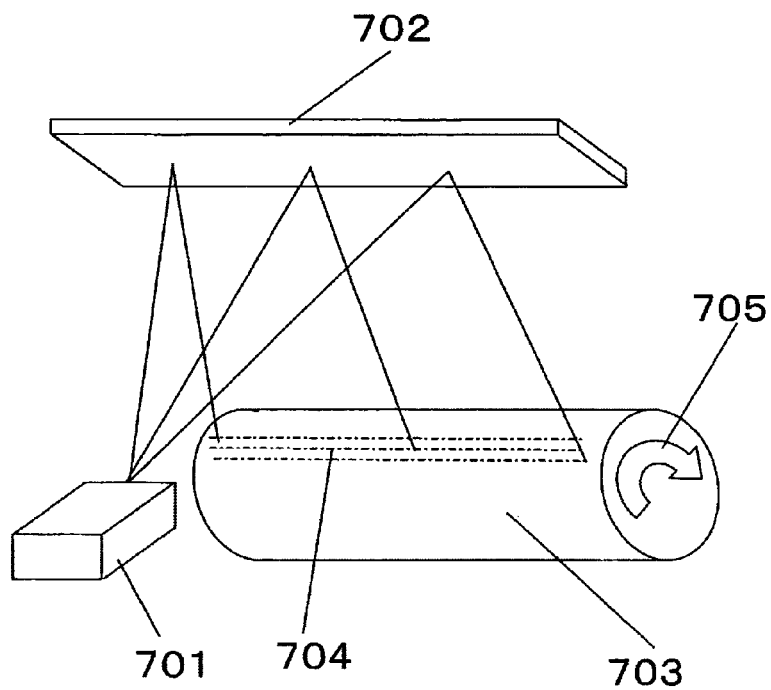

FIG. 20 is a schematic view showing a configuration in a case where the projection type image display apparatus is used as a writing optical system.

Figure 21:
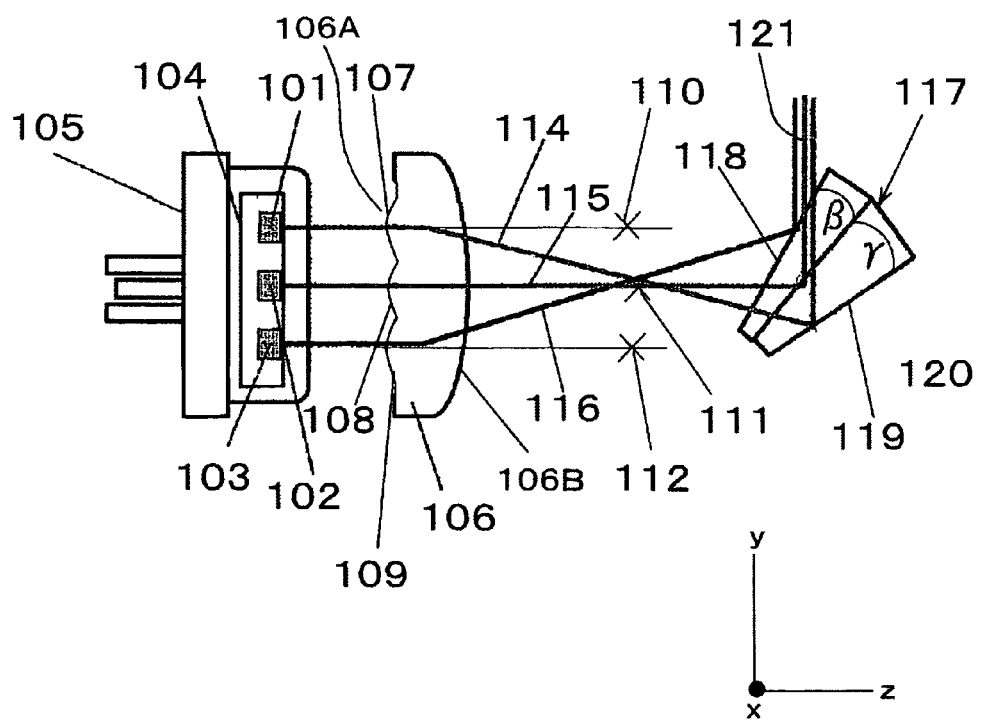

FIG. 21 is a schematic view showing an illuminating device in a case where light sources (semiconductor laser) for three colors of blue, green and red are incorporated in one package.

Figure 22:
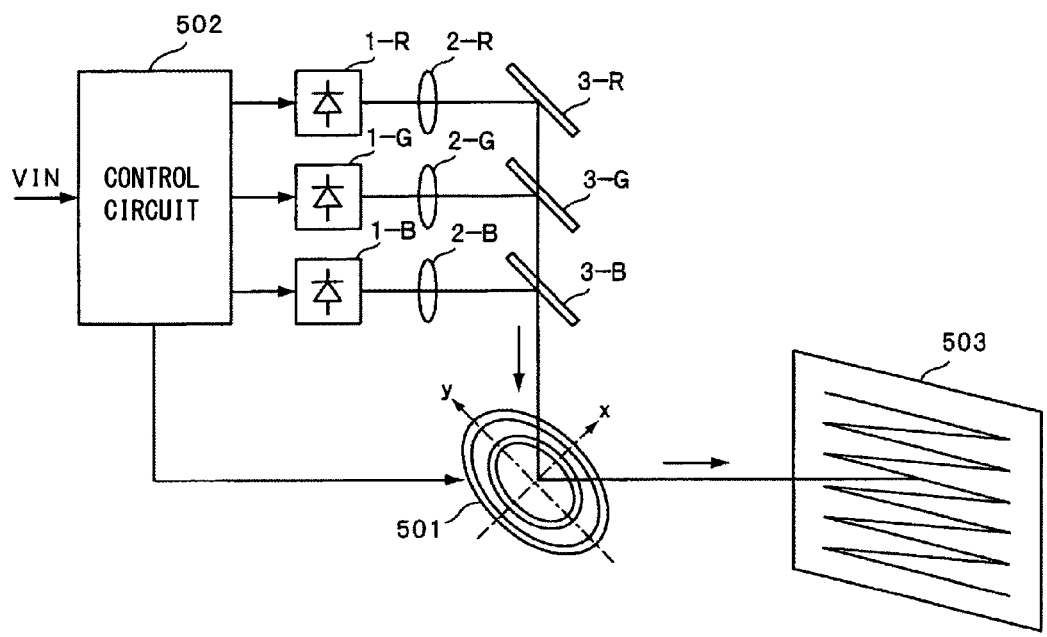

FIG. 22 is a schematic view showing a conventional configuration of a scanning type projector having lasers of three primary colors and a MEMS mirror.

Figure 23:
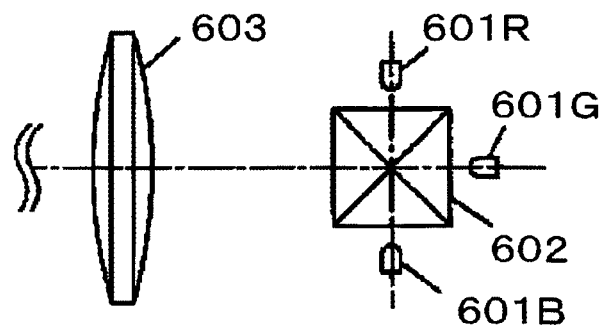

FIG. 23 is a schematic view showing a conventional configuration where light from light sources of three primary colors is combined by a dichroic prism and focused by a focusing lens.

Figure 24:
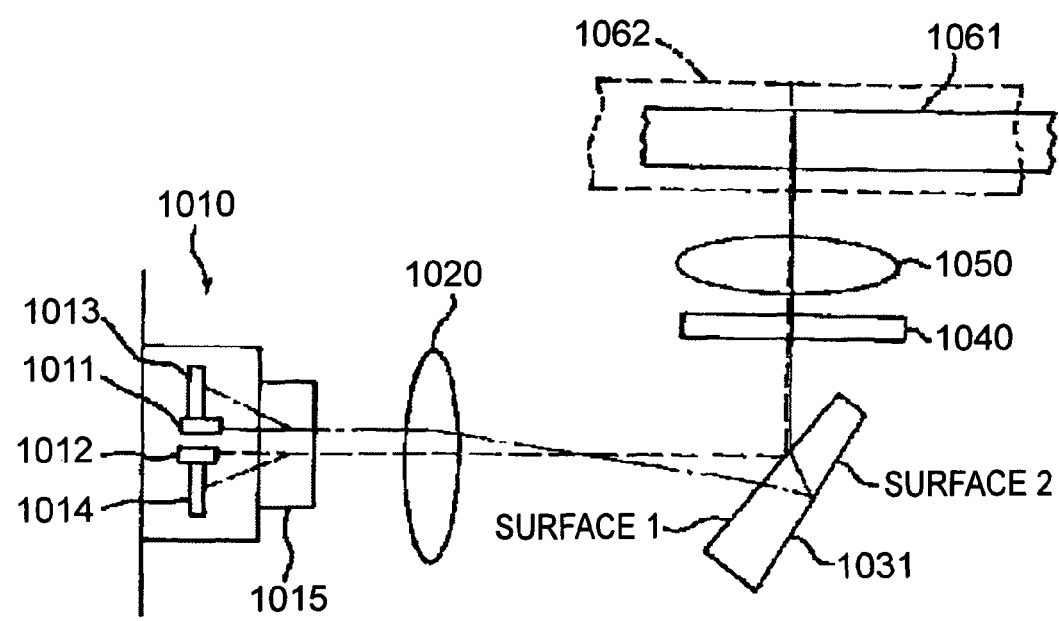

FIG. 24 is a schematic view showing a conventional configuration where light from a plurality of light sources is combined on one light path via a two beam combining prism.

MODE FOR CARRYING OUT THE INVENTION

Hereinafter, preferred embodiments of this invention will be described in detail based on the drawings.

Figure 1:
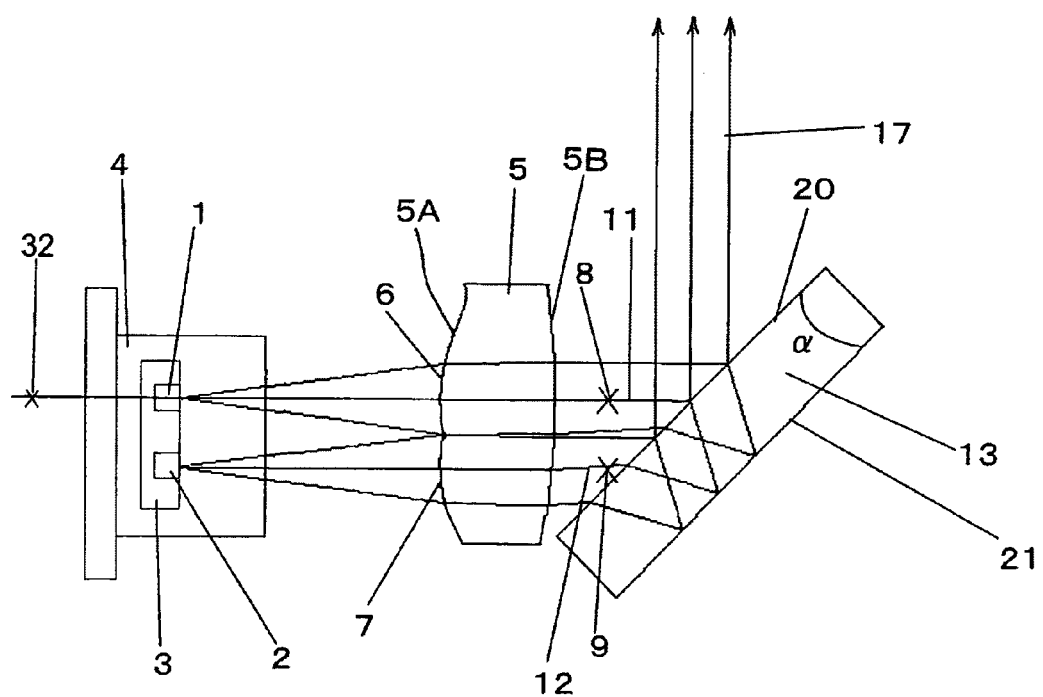
FIG. 1 is a schematic view showing a configuration of an illuminating device according to a first embodiment of the present invention.
Figure 1:
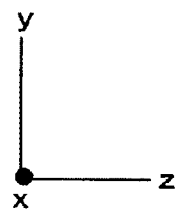

FIG. 1 shows an illuminating device having a coupling lens according to a first embodiment of the present invention. The illuminating device includes a first light source 1 configured to emit first light having a first wavelength $\lambda 1$, a second light source 2 disposed adjacent to the first light source 1 and configured to emit second light having a second wavelength $\lambda 2$, and a coupling lens 5 configured to couple the first light with the second light. The first light and the second light are emitted in the substantially same direction. The coupling lens 5 has a first surface 5A facing the first and second light sources 1, 2 and a second surface 5B disposed at an opposite side of the first surface 5A and having a second-surface curvature. The first surface 5A includes a first region 6 through which the first light passes and a second region 7 through which the second light passes. The first region 6 has a first region curvature and the second region 7 has a second region curvature. A position of a first region curvature center of the first region curvature of the first region 6 differs from a position of a second region curvature center of the second region curvature of the second region 7. A second surface curvature center of the second surface curvature of the second surface 5B and the first region curvature center are disposed on an optical axis of the first or second light source 1, 2. The first and second light sources 1, 2 are mounted adjacent to each other on the same mount 3 as one package 4.

As the first light source 1, a semiconductor laser configured to emit light having a wavelength in a red-color range (hereinafter, "red LD"), and as the second light source 2, a semiconductor laser configured to emit light having a wavelength in a blue-color range (hereinafter, "blue LD") can be used.

The blue-color range and the red-color range may be 400 nm to 480 nm and 600 nm to 700 nm, respectively. The red LD emitting red light where the wavelength $\lambda 1$ is, for example, 640 nm and the blue LD emitting blue light where the wavelength $\lambda 2$ is, for example, 445 nm can be used, and in the following examples these wavelengths are used. In this embodiment, although the red LD 1 and the blue LD 2 are formed on separate chips and mounted in the same mount 3, the blue LD 1 and the red LD 2 may be formed on one chip.

The illuminating device may include a light-path forming element configured to match a light path of the first light with a light path of the second light. The light-path forming element may be a wedge prism.

The red light 11 emitted from the red LD 1 and the blue light 12 emitted from the blue LD 2 are coupled by one coupling optical system (hereinafter, "CL") 5 and then guided to the wedge prism 13 as the light forming element. In FIG. 1, light paths of the light of each color are schematically illustrated.

The red light 11 and the blue light 12 enter the wedge prism 13, are combined and emitted on one light path. Accordingly, the illuminating device is configured such that the two types of light in the blue and red wavelength ranges are emitted in the one light path.

In the above explanation, although the red wavelength range for the first light source and the blue wavelength range for the second light source are used, other wavelength ranges may be used.

The wedge prism 13 is a flat plate including a first prism surface 20 through which the light in the blue wavelength range passes and a second prism surface 21 configured to reflect the light in the blue wavelength range. The first prism surface and the second prism surface of the wedge prism 13 are formed in a wedge shaped flat plate and relatively inclined at an angle of a.

The red light 11 and the blue light 12 enter the first prism surface 20 and are reflected on the first and second prism surfaces and then emitted therefrom, respectively. The first and second prism surfaces which are configured to selectively reflect or transmit light depending on the wavelength, respectively, may be formed by optical multilayer films which are referred to as dichroic filters.

The CL 5 will be further specifically explained. The first surface 5A of the CL 5, which is a surface at a side of the light sources, that is, a light-source side surface, has the first region 6 through which only the red light 11 passes and the second region 7 through which only the blue light 12 passes.

A curvature center of a lens surface of the first region 6 is in a position shown by reference number 8 in FIG. 1 and a curvature center of a lens surface of the second region 7 is in a position shown by reference number 9 in FIG. 1, that is, the two curvature centers are in the positions 8, 9 which differ from each other.

A second surface 5B of the CL 5, which is opposite to the first and second regions 6, 7, is formed by a single surface.

Positional relationships of the curvature centers of the first and second surfaces 5A, 5B of the CL 5 are shown in FIGS. 2A and 2B. The light is emitted in a z direction which is a direction of an optical axis of each light source. The optical axes of the first and second light sources 1, 2 are shown by reference numbers 30, 31.

In FIG. 2A, the curvature center of the second surface 5B of the CL 5 is in a position shown by reference number 32 and the curvature center of the first region 6 of the first surface 5A is in a position shown by reference number 8.

Both of the curvature centers 8, 32 are on the optical axis of the first light source 1 and the lens surface of the first region 6 of the first surface 5A of the CL 5 and the second surface 5B are configured to be in a state where they are not relatively shifted to each other. Accordingly, easy designing of lenses can be achieved without considering performance degradation due to the shifting of the surfaces.

FIG. 2B shows a case where the curvature centers 9, 32 are on the optical axis of the second light source 2. In this example, the first region is shown by the reference number 6 and the second region is shown by the reference number 7.

Specific design of an example of the coupling lens according to the present invention will be shown.

The specific design of the example of the present invention is shown in Table 1 together with another design as a comparative example where a surface at a side of a light source, that is, a light-source side surface, is formed by a single surface.

TABLE 1

| | | LIGHT SOURCE SIDE SINGLE LENS SURFACE | LIGHT SOURCE SIDE TWO REGIONS | | NOTE |
|---|---|---|---|---|---|
| | | | FIRST REGION | SECOND REGION | |
| WAVELENGTH | nm | 640, 445 | 640 | 445 | |
| CURVATURE RADIUS OF FIRST SURFACE | mm | 5.49032 | 5.72307 | 5.72307 | |
| AN INTERVAL OF CURVATURE CENTER POSITIONS | mm | — | 0.911 | | FIG. 4, y DIRECTION, NO DEVIATION IN x, z DIRECTIONS |
| CURVATURE RADIUS OF SECOND SURFACE | mm | −9.09682 | −8.50328 | −8.50328 | |
| SURFACE INTERVAL | mm | 1.5 | 1.5 | 1.5 | FIG. 4, z DIRECTION |
| REFRACTIVE INDEX OF LENS | | | | | |
| 640 nm | | | 1.506643 | | |
| 445 nm | | | 1.519219 | | |
| FOCAL LENGTH | mm | | | | |
| 640 nm | | 7 | 7 | — | |
| 445 nm | | 6.8345 | — | 6.8346 | |
| NUMERICAL APERTURE | | | | | |
| 640 nm | | 0.069 | 0.069 | — | |
| 445 nm | | 0.074 | — | 0.071 | |
| INTERVAL OF LIGHT SOURCES(Y) | mm | 0.7 | 0.9 | | FIG. 4, y DIRECTION |
| LIGHT-PATH FORMING ELEMENT | | | | | |
| THICKNESS AT CENTER | mm | 0.8 | 1.1 | | |
| APEX ANGLE α | deg | 5.49 | 8 | | |

TABLE 1-continued

|  | | LIGHT SOURCE SIDE | LIGHT SOURCE SIDE TWO REGIONS | |
|---|---|---|---|---|
|  | | SINGLE LENS SURFACE | FIRST REGION | SECOND REGION | NOTE |
| COVER GLASS | | | | | |
| THICKNESS | mm | | 0.25 | | |
| MATERIAL | | | BK7 | | |
| WAVE ABERRATION | λ (R.M.S) | | | | |
| WAVELENGTH | 640 nm | 0.0053 | 0.0083 | — | |
|  | 445 nm | 0.1726 | — | 0.0352 | |

A configuration shown in FIG. 3 shows an optical system in a conventional design system where the light source side surface of the CL 5 is formed by the single surface.

In the configuration shown in FIG. 3, reference number 1 indicates a light source of the wavelength 640 nm, 2 a light source of the wavelength 445 nm, and 18 a cover glass of the package 4 shown in FIG. 1.

The light emitted from one of the first and second light sources, which passes through the first region curvature center of the first surface and the second surface curvature center, may be configured to be reflected on a front surface of the wedge prism and light emitted from the other of the first and second light sources may be configured to pass through the second region of the first surface and be reflected on a rear surface of the wedge prism.

After the light from the light sources 1, 2 is coupled with each other by the CL 5, the light of 640 nm is reflected on a front surface (here, the first prism surface) of the wedge prism 13 and the light of 445 nm is reflected on a rear surface (here, the second prism surface) of the wedge prism 13. An apex angle of the wedge prism 13 is α and reference number 19 indicates a light flux of the light which is formed by combining the light of the two wavelengths.

A configuration shown in FIG. 4 shows an optical system in a design system based on the present invention where the first surface 5A of the CL 5, which is at the side of the light source is divided into the first region 6 and the second region 7. The light of the wavelength of 640 nm is configured to pass through the first region 6 and the light of the wavelength of 445 nm is configured to pass through the second region. Otherwise, the same configurations as the configurations shown in FIG. 1 are used.

In Table 1, a value of wave aberration is obtained when the aplanatic light passes from a side of the first prism surface 20 of the wedge prism 13, that is, in a y direction and is focused at a side of the light sources. Although under actual use, the light enters the wedge prism 13 from the light-source side, aberration in total in the optical system can be evaluated by this method.

Referring to wave aberration in the results shown in Table 1, in a case where the light-source side surface of the CL 5 is formed by the single surface, the light of 640 nm is substantially aplanatic and the light of 445 nm has a wave aberration of 0.17λ so that the configuration is not at a practical level.

On the other hand, in a case where the light-source side surface, that is, the first surface 5A of the CL 5 according to this embodiment of the present invention is formed by the first region 6 and the second region 7, the light of 640 nm is substantially aplanatic and the light of 445 nm has a wave aberration of 0.0352μ so that the configuration has a reduced wave aberration at a practical level.

The wave aberration at the practical level is about 0.07λ (R.M.S.) or less.

A second embodiment of the present invention will be explained with reference to FIG. 5.

The light emitted from the light source which has the optical axis passing through positions of the curvature center 32 of the second surface 5B of the CL 5, which is opposite to the first surface 5A, and the curvature center 8 of the first region 6 of the first surface 5A of the CL 5 is reflected on the front surface 20 of the wedge prism 13.

The light flux reflected on the rear surface 21 of the wedge prism 13 has an astigmatism and the light flux reflected on the front surface 20 of the wedge prism 13 has no aberration in a case where the reflection surface 20 is an ideal planar surface. According to this configuration where the light passing through the opposite surfaces of the CL 5 without being relatively shifted is reflected on the front surface 20 of the wedge prism 13, good optical properties can be achieved.

On the other hand, the second surface 5B of the CL 5, which is opposite to the first surface 5A, and the lens surface of the second region 7 of the first surface 5A of the CL 5 are relatively shifted to each other so that astigmatism is generated. It is possible to cancel the astigmatism generated in the CL 5 and the astigmatism generated when the light is reflected on the rear surface 21 of the wedge prism 13 by optimizing lens configurations (thickness, curvature, aspherizing, refractive index, and the like), configurations of the wedge prism (thickness, apex angle α, refractive index, and the like) and a position of luminous point.

According to the configuration of this embodiment, light paths of the light from two light sources 1, 2 can be combined to form a light flux having small aberration.

A third embodiment of the present invention will be explained with reference to FIG. 6.

The illuminating device according to this embodiment further includes a third light source 14 in addition to the first and second light sources 1, 2 described in the first embodiment (see FIG. 1).

More specifically, the third light source 14 is disposed so as to emit third light having a third wavelength in a direction which differs from the emitted direction of the first light from the first light source 1 and the second light from the second light source 2. In this embodiment, the third light is emitted in a direction substantially perpendicular to the first and second light. As the third light source 14, a green light source configured to emit the third light having the wavelength in a green color wavelength range of 500 nm to 550 nm may be used. A semiconductor laser is preferably used as the green light source. However, actually there exists no green semiconductor laser, which can be steadily used, and therefore harmonic waves of a solid laser or an infrared semiconductor laser are used.

A specific configuration of the green light source will be described later, and the light source of the wavelength λ3 of 530 nm is used in this embodiment.

The illuminating device further includes a secondary coupling lens or a secondary coupling optical system (hereinafter, "second CL") 15 configured to couple the green third light from the green light source 14, and then the green third light is guided to the wedge prism 13. The third light passing through the secondary coupling lens may be configured to pass the wedge prism and a light path of the third light may be configured to be matched with the light paths of the first and second light. The red light 11, the blue light 12, and the green light 16, which enter the wedge prism 13 are combined on one light path and emitted. As described above, the illuminating device is configured such that the light fluxes of the blue, red, and green wavelength ranges are emitted on the one light path.

As described above, although the red wavelength range is used for the first light source, the blue wavelength range is used for the second light source, and the green wavelength range is used for the third light source, other wavelength ranges may be used. The light source which is configured to emit combined light of red, blue, and green light is most advantageous because the light source can be used for a scanning type projector.

As described above, since it is difficult to use a semiconductor laser as the green light source, it is not easy to arrange the green light source on one mount with the other light sources. Accordingly, the configuration in that the first light source is the red or blue light source, the second light source is the blue or red source, and the third light source is green is advantageous for easy production.

The wedge prism 13 is a flat plate having a first prism surface 20 configured to reflect the light of the red wavelength range and transmit the light of the blue and green wavelength ranges, and a second surface 21 configured to reflect the light of the blue wavelength range and transmit the light of the green wavelength range. The wedge prism 13 has a wedge shaped flat plate in which the first and second surfaces of the wedge prism 13 are relatively inclined to each other.

The red and blue light fluxes 11, 12, which enter the first prism surface 20, are reflected on the first and second surfaces of the wedge prism 13, and then emitted, respectively. The green light flux 16 enters the second prism surface 21, passes through the second and first prism surfaces 21, 20, and is then emitted. The first and second prism surfaces 20, 21 are configured to selectively reflect or transmit light flux depending on the wavelength of the light flux and may be formed by optical multilayer films, which are referred to as dichroic mirrors.

A fourth embodiment of the present invention will be explained with reference to FIGS. 1 and 7.

A light intensity of the light emitted from the light source, which can be coupled by the coupling lens, is determined by a numerical aperture of the optical system.

The coupling lens may be formed by a plurality of materials each having different refractive index from each other.

In FIG. 7, the numerical aperture NA is determined by the following equation (1):

$$NA = \sin\theta \quad (1)$$

Reference number 101 indicates a light source, 102 is a coupling lens, 103 is a position of a front side cardinal point, $\theta$ is a half of an angle at which light from the light source enters the coupling lens, f is a focal length of the coupling lens, and D is an effective diameter of the coupling lens.

The light emitted from the coupling lens 102 is parallel light. It is necessary that a plurality of light fluxes be coupled by the single coupling lens 102 and, in a case where the light is used for illumination, each of diameters of the light fluxes emitted from the coupling lens is the substantially same. The diameter 1 of the emitted light from the coupling lens 102 is obtained by the following equation (2):

$$\Phi = 2 \times f \times NA \quad (2)$$

Accordingly, in a case where the entering angles of the plurality of light fluxes are substantially the same as each other, that is, NA is substantially the same, it is necessary that the focal lengths of the coupling lens 102 for the plurality of light fluxes be substantially the same as each other. In a case where the wavelengths of the light sources are different, refractive indexes of materials in the coupling lens 102 should be different. Accordingly, in the light source side surface of the CL 5 in the first embodiment shown in FIG. 1, the curvature radiuses of the first region 6 through which only the first light of the first wavelength passes and the second region 7 through which only the second light of the second wavelength passes may be changed so that the focal length may be configured to be substantially the same focal length by the single coupling lens for the two light fluxes having different wavelengths.

Results of an example of the lens design are shown in Table 2. The curvature radiuses of the first and second regions are configured to be different from each other, and then the optical system can have the same focal length and the same numerical aperture for the different light having different wavelengths.

TABLE 2

|  |  | FIRST REGION | SECOND REGION | NOTE |
|---|---|---|---|---|
| WAVELENGTH | nm | 640 | 445 | |
| CURVATURE RADIUS OF FIRST SURFACE | mm | 5.42737 | 5.64346 | |
| AN INTERVAL OF CURVATURE CENTER POSITIONS | mm | 0.856844 | | FIG3, y DIRECTION, NO DEVIATION IN x, z DIRECTIONS |
| CURVATURE RADIUS OF SECOND SURFACE | mm | −9.28259 | | |
| SURFACE INTERVAL | mm | 1.5 | 1.5 | FIG. 3, z DIRECTION |
| REFRACTIVE INDEX OF LENS | | 1.506643 | 1.519219 | |
| FOCAL LENGTH | mm | 7 | 7 | |
| NUMERICAL APERTURE | | 0.069 | 0.069 | |
| INTERVAL OF LIGHT SOURCES LIGHT-PATH | mm | 0.9 | | FIG. 3, y DIRECTION |

TABLE 2-continued

| FORMING ELEMENT | | FIRST REGION | SECOND REGION | NOTE |
|---|---|---|---|---|
| THICKNESS AT CENTER | mm | | 1.1 | |
| APEX ANGLE α | deg | | 0.8 | |
| COVER GLASS | | | | |
| THICKNESS | mm | | 0.25 | |
| MATERIAL | | | BK7 | |
| WAVE ABERRATION | λ(R.M.S) | 0.0091 | 0.0312 | |

A fifth embodiment of the present invention will be explained with reference to FIGS. 1, 4, 7, 8, 9A and 9B. In FIG. 8, the same reference numbers are used for the same configurations as those in FIG. 4. In the fourth embodiment, since the curvature radius of the first region 6 of the CL 5 is set to be different from the curvature radius of the second region 7 of the CL 5, for the light having different wavelengths, the same focal length and the same numerical aperture can be achieved and therefore the light fluxes emitted from the CL 5 can have the same diameter.

Here, if light intensity distribution patterns (far-field pattern: FFP) of the light fluxes emitted from the two light sources 1, 2 are substantially the same, it can be determined that the optical system is in a state where "the light fluxes have substantially the same diameter".

The FFP of a semiconductor laser, which is commonly used as a light source, differs depending on the type of the semiconductor laser. The diameter is ideally required to be the same under consideration of the difference in the FFP.

In order to set the diameters of the light fluxes after passing through the coupling lens 5 in a case where the light sources 1, 2 have different FFPs from each other, it is required only to determine the numerical aperture of the lens so as to set the intensity of the light entering the coupling lens 5 at a maximum angle to be the same.

In a case where the diameter D of the light flux, which enters the coupling lens, is constant as shown in FIG. 7, changing the NA corresponds to changing the focal length of the coupling lens.

In FIG. 4, if a relationship of A<B is set where the FFP of the first light source 1 is A (deg) as a full width at half maximum and the FFP of the second light source 2 is B (deg) and then f1>f2 where the focal length of the first region of the CL 5 for the light passing through the region 6 in FIG. 4 is f1 and the focal length of the second region of the CL 5 for the light passing through the region 7 in FIG. 7, it is possible for the intensity distributions of the two light fluxes 19 combined by the wedge prism 13 to be substantially the same as each other.

FIG. 8 shows a light path and shape of the CL 5 designed so as to be f1>f2 and Table 3 shows results for the designed configuration. As the results, when the focal lengths of the first and second regions 6, 7 are changed, positions of the first and second light sources 1, 2 deviate from each other in a z direction shown by Δd in FIG. 8.

TABLE 3

| | | FIRST REGION | SECOND REGION | NOTE |
|---|---|---|---|---|
| WAVELENGTH | nm | 640 | 445 | |
| CURVATURE RADIUS OF FIRST SURFACE | mm | 5.42737 | 5.01007 | |
| AN INTERVAL OF CURVATURE CENTER POSITIONS | mm | | 0.86159 | FIG8, y DIRECTION, NO DEVIATION IN x, z DIRECTIONS |
| CURVATURE RADIUS OF SECOND SURFACE | mm | | −9.28259 | |
| SURFACE INTERVAL | mm | 1.5 | 1.5 | FIG. 8, z DIRECTION |
| REFRACTIVE INDEX OF LENS | | 1.506643 | 1.519219 | |
| FOCAL LENGTH | mm | 7 | 6.5 | |
| NUMERICAL APERTURE | | 0.069 | 0.074 | |
| INTERVAL OF LIGHT SOURCES (X) | mm | | 0 | FIG. 8, x DIRECTION |
| INTERVAL OF LIGHT SOURCES (Y) | mm | | 0.9 | FIG. 8, y DIRECTION |
| INTERVAL OF LIGHT SOURCES (Z) | mm | | 0.51 | FIG. 8, z DIRECTION Δd |
| LIGHT-PATH FORMING ELEMENT | | | | |
| THICKNESS AT CENTER | mm | | 1.1 | |
| APEX ANGLE α | deg | | 0.8 | |

TABLE 3-continued

| | | FIRST REGION | SECOND REGION | NOTE |
|---|---|---|---|---|
| COVER GLASS | | | | |
| THICKNESS | mm | | 0.25 | |
| MATERIAL | | | BK7 | |
| WAVE ABERRATION | λ(R.M.S) | 0.0091 | 0.0333 | |

FIGS. 9A and 9B show a state where the emitting points (light sources) 1, 2 are disposed on a mount 3. The light sources 1, 2 generate heat when the light sources 1, 2 emit the light, and it is required to release the heat in order to prevent degradation of characteristics, reduction of life cycle of a product, and the like. The mount 3 is configured to release the heat generated by the light sources 1, 2 and it is preferable that the contact part between the light sources 1, 2 and the mount 3 be large.

Accordingly, when the two light sources 1, 2 deviate in the z direction of FIGS. 9A, 9B, one light source cannot be displaced from the mount 3 to a front side in the emitting direction and therefore the one is displaced to a rear side of the mount 3.

FIG. 9A is a view showing a state where the light source 1 is displaced to the rear side on the mount 3. In this state, there is no problem in releasing heat. However, as shown in FIG. 9B viewed from the y direction, if the light source is displaced excessively to the rear side, a part at a side of the mount 3 in a-x direction of FIG. 9B within the light emitted from the light source 1 comes to the mount 3 or is shaded by the mount 3 so that it is possible that an emitted light distribution is distorted.

Accordingly, the emitting points of the two light sources 1, 2 are preferably the substantially the same position in the z direction of FIG. 9B.

A lens thickness of the first region may differ from a lens thickness of the second region.

If the positions of the emitting points of the first and second light sources 1, 2 in the emitting direction can be disposed at substantially the same position, one light source is not deviated from the mount 3 so that the release of the heat from the light sources can be sufficiently achieved. Moreover, it is not necessary to dispose one light source at the rear side of the mount so that the shade of the light emitted from the light source by the mount can be prevented. In a case where the focal length f1 of the first region of the CL 5 is different from the focal length f2 of the second region of the CL 5, the design suppresses the deviation of the two emitting points 1, 2 by setting a thickness of the first region of the CL 5 to be different from that of the second region of the CL 5.

FIG. 10 shows a light path and shape of the CL 5 and Table 4 shows results for the designed configuration. It is shown that the deviation of the emitting points 1, 2 in the z direction can be reduced with the same focal length, the same numeric aperture, and wave aberration as the coupling lens shown in FIG. 8 and Table 3.

TABLE 4

| | | FIRST REGION | SECOND REGION | NOTE |
|---|---|---|---|---|
| WAVELENGTH | nm | 640 | 445 | |
| CURVATURE RADIUS OF FIRST SURFACE | mm | 5.42737 | 4.91245 | |
| AN INTERVAL OF CURVATURE CENTER POSITIONS | mm | | 0.86157 | FIG10, y DIRECTION, NO DEVIATION IN x, z DIRECTIONS |
| CURVATURE RADIUS OF SECOND SURFACE | mm | | −9.28259 | |
| SURFACE INTERVAL | mm | 1.5 | 2 | FIG. 10, z DIRECTION D1, D2 |
| REFRACTIVE INDEX OF LENS | | 1.506643 | 1.519219 | |
| FOCAL LENGTH | mm | 7 | 6.5 | |
| NUMERICAL APERTURE | | 0.069 | 0.074 | |
| INTERVAL OF LIGHT SOURCES (X) | mm | | 0 | FIG. 10, x DIRECTION |
| INTERVAL OF LIGHT SOURCES (Y) | mm | | 0.9 | FIG. 10, y DIRECTION |
| INTERVAL OF LIGHT SOURCES (Z) | mm | | 0.127 | FIG. 10, z DIRECTION Δd |
| LIGHT-PATH FORMING ELEMENT | | | | |
| THICKNESS AT CENTER | mm | | 1.1 | |
| APEX ANGLE α | deg | | 0.8 | |
| COVER GLASS | | | | |
| THICKNESS | mm | | 0.25 | |
| MATERIAL | | | BK7 | |
| WAVE ABERRATION | λ(R.M.S) | 0.0091 | 0.0333 | |

Next, a sixth embodiment of the present invention will be explained.

If the wavelength of a light flux is changed, a refracting angle of the light flux reflected on the rear surface of the wedge prism 13 is changed so that a reflection angle is changed. On the other hand, there is no change in refracting angle of the light flux reflected on the front surface of the wedge prism 13 because the light flux is reflected without refraction of the light.

The wavelength of the semiconductor laser is changed due to emitting outputs, temperature change, or the like. In general, the wavelength change of the red semiconductor laser is one digit larger than that of the blue semiconductor laser.

Thereby, the light emitted from the red semiconductor laser in which the wavelength is largely changed is configured to be reflected on the front surface of the wedge prism 13 and the light emitted from the blue semiconductor laser in which the wavelength is less changed is configured to be reflected on the rear surface of the wedge prism 13. Accordingly, even if the wavelength is changed due to the temperature change, the change in the angle of the light reflected on the wedge prism 13 can be reduced.

Next, a seventh embodiment of the present invention will be explained.

In order to improve an efficiency of coupling the light from the light source, that is, light use efficiency, it is necessary to increase the numerical aperture of the coupling lens 5, that is, increase the value of NA in the equation (2).

As described in the fourth embodiment, when the diameter of the light flux, which enters the coupling lens, as shown by D in FIG. 7 is constant, changing NA changes the focal length of the coupling lens 5. Furthermore, in this case, increasing the NA corresponds to decreasing the focal length.

An effective focal length of each of the first and second regions 6, 7 may be 5 mm or less.

FIG. 11 and Table 4 show results for the designed configuration in a case where the focal length is 5 mm. As the focal length becomes small, degradation in the wave aberration of the light passing through the lens surface of the second region 7 of the CL 5 becomes large. In order to suppress the degradation, the lens surface of the second region 7 of the CL 5 is preferably formed by an aspheric surface.

TABLE 5

|  |  | FIRST REGION | SECOND REGION | NOTE |
|---|---|---|---|---|
| WAVELENGTH | nm | 640 | 445 | |
| CURVATURE RADIUS OF FIRST SURFACE | mm | 3.48862 | 3.61347 | |
| AN INTERVAL OF CURVATURE CENTER POSITIONS | mm | | 0.938104 | FIG. 11, y DIRECTION, NO DEVIATION IN x, z DIRECTIONS |
| CURVATURE RADIUS OF SECOND SURFACE | mm | | −7.91249 | |
| SURFACE INTERVAL | mm | 1.5 | 1.5 | FIG. 11, z DIRECTION |
| REFRACTIVE INDEX OF LENS | | 1.506643 | 1.519219 | |
| FOCAL LENGTH | mm | 5 | 5 | |
| NUMERICAL APERTURE | | 0.096 | 0.095 | |
| INTERVAL OF LIGHT SOURCES (X) | mm | | 0 | FIG. 11, x DIRECTION |
| INTERVAL OF LIGHT SOURCES (Y) | mm | | 0.9 | FIG. 11, y DIRECTION |
| INTERVAL OF LIGHT SOURCES (Z) | mm | | 0.024 | FIG. 11, z DIRECTION |
| LIGHT-PATH FORMING ELEMENT | | | | |
| THICKNESS AT CENTER | mm | | 1.1 | |
| APEX ANGLE α | deg | | 0.8 | |
| COVER GLASS | | | | |
| THICKNESS | mm | | 0.25 | |
| MATERIAL | | | BK7 | |
| WAVE ABERRATION | λ(R.M.S) | 0.0287 | 0.0548 | |

An aspheric shape is expressed by the following equation (3):

$$x = \frac{\frac{1}{r}R^2}{1 + \sqrt{1 - (1+\kappa)\frac{1}{r^2}R^2}} + AR^4 + BR^6 + CR^8 + $$

$$R = \sqrt{y^2 + z^2} \quad DR^{10} + ER^{12} + FR^{14} + GR^{16} + HR^{18} + JR^{20} + \ldots$$

where
r is a radius of paraxial curvature;
κ is a conic constant;
A, B, C, D, E, F, G, H, J, . . . are aspheric factors.

Results of the designed configuration in which the lens surface of the second region 7 of the CL 5 is formed as an aspheric surface are shown in Table 6. The wave aberration of the light passing through the lens surface of the second region 7 of the CL 5 is improved. In a case where the focal length is required to be small in order to increase a performance and a coupling efficiency, the first region 6 and the second surface 5B are also formed by an aspheric surface in addition to the second region 7 of the CL 5 so that a good wave surface can be obtained.

TABLE 6

| | | FIRST REGION | SECOND REGION | NOTE |
|---|---|---|---|---|
| WAVELENGTH | nm | 640 | 445 | |
| CURVATURE RADIUS OF FIRST SURFACE | mm | 3.48851 | 3.61335 | |
| ASPHERIC FACTOR OF FIRST SURFACE | | | | |
| K | | — | 0.162821 | |
| A | | — | −0.0414955 | |
| B | | — | 0.32373 | |
| C | | — | −1.49199 | |
| D | | — | 2.52962 | |
| AN INTERVAL OF CURVATURE CENTER POSITIONS | mm | 0.938104 | | FIG. 11, SAME AS y DIRECTION, NO DEVIATION IN x, z DIRECTIONS |
| CURVATURE RADIUS OF SECOND SURFACE | mm | −7.91314 | | |
| SURFACE INTERVAL | mm | 1.5 | 1.5 | FIG. 11, SAME AS z DIRECTION |
| REFRACTIVE INDEX OF LENS | | 1.506643 | 1.519219 | |
| FOCAL LENGTH | mm | 5 | 5 | |
| NUMERICAL APERTURE | | 0.098 | 0.095 | |
| INTERVAL OF LIGHT SOURCES (X) | mm | 0 | | FIG. 11, x DIRECTION |
| INTERVAL OF LIGHT SOURCES (Y) | mm | 0.9 | | FIG. 11, y DIRECTION |
| INTERVAL OF LIGHT SOURCES (Z) | mm | 0.049 | | FIG. 11, z DIRECTION |
| LIGHT-PATH FORMING ELEMENT | | | | |
| THICKNESS AT CENTER | mm | 1.1 | | |
| APEX ANGLE α | deg | 0.8 | | |
| COVER GLASS | | | | |
| THICKNESS | mm | 0.25 | | |
| MATERIAL | | BK7 | | |
| WAVE ABERRATION | λ(R.M.S) | 0.0294 | 0.0409 | |

Next, an eighth embodiment of the present invention will be explained.

As described in the second embodiment, the surface (second surface) 5B opposite to the first surface 5A of the CL 5 and the lens surface of the second region 7 of the first surface 5A are relatively shifted to each other so that astigmatism is generated and the light is reflected on the rear surface 21 of the wedge prism 13 so that the astigmatism is generated.

The second region of the coupling lens may be formed by a cylindrical surface, a toroidal surface, or an anamorphic aspheric surface.

The lens shape to correct the astigmatism may be a toroidal lens having surfaces of different curvatures in directions perpendicular to each other. Table 7 shows a designed example of the toroidal lens. Compared with Table 1, the wave aberration of the light passing through the second region is improved.

TABLE 7

| | | FIRST REGION | SECOND REGION | NOTE |
|---|---|---|---|---|
| WAVELENGTH | nm | 640 | 445 | |
| CURVATURE RADIUS OF FIRST SURFACE | mm | 5.86626 | — | |
| x | | — | 6.09559 | |
| y | | — | 6.12128 | |
| AN INTERVAL OF CURVATURE CENTER POSITIONS | mm | 0.938104 | | FIG. 11, SAME AS y DIRECTION, NO DEVIATION IN x, z DIRECTIONS |
| CURVATURE RADIUS OF SECOND SURFACE | mm | −8.19734 | | |
| SURFACE INTERVAL | mm | 1.5 | 1.5 | FIG. 11, SAME AS z DIRECTION |
| REFRACTIVE INDEX OF LENS | | 1.506643 | 1.519219 | |
| FOCAL LENGTH | mm | 7 | 7 | |
| NUMERICAL APERTURE | | 0.069 | 0.07 | |
| INTERVAL OF LIGHT SOURCES (X) | mm | 0 | | FIG. 11, x DIRECTION |

TABLE 7-continued

|  |  | FIRST REGION | SECOND REGION | NOTE |
|---|---|---|---|---|
| INTERVAL OF LIGHT SOURCES (Y) | mm |  | 0.9 | FIG. 11, y DIRECTION |
| INTERVAL OF LIGHT SOURCES (Z) | mm |  | 0.053 | FIG. 11, z DIRECTION |
| LIGHT-PATH FORMING ELEMENT |  |  |  |  |
| THICKNESS AT CENTER | mm |  | 1.1 |  |
| APEX ANGLE α | deg |  | 0.8 |  |
| COVER GLASS |  |  |  |  |
| THICKNESS | mm |  | 0.25 |  |
| MATERIAL |  |  | BK7 |  |
| WAVE ABERRATION | λ(R.M.S) | 0.0081 | 0.0238 |  |

Otherwise, the surface shapes of the CL 5, where the curvatures of the surfaces are perpendicular to each other, may be a toroidal aspheric surface or an anamorphic aspheric surface.

The toroidal aspheric surface is defined as follows. x, y, z directions are shown in FIG. 1. A profile in a y-z plane is defined by the aspheric surface shown by the equation (4):

$$z = \frac{cy^2}{\sqrt{1 + \{1 - (1+k)c^2 y^2\}}} + Ay^4 + By^6 + Cy^8 + Dy^{10} \quad (4)$$

In the equation (4),
c is a curvature at a surface apex;
k is a conic constant;
A, B, C, D, . . . are aspheric factors.

Next, the profile obtained by the equation (4) in the y-z plane is rotated about the y axis passing through a center of the curvature in the x direction. Accordingly, the surface is aspheric in the y-z plane, and circular in an x-z plane. The surface is defined as a y toroidal aspheric surface.

Similarly, an x toroidal aspheric surface is defined by an aspheric surface, which is obtained by using the equation (4) for the profile of the x-z plane (y is replaced by x). Then, the profile of the x-z plane is rotated about an x axis passing through a center of the curvature in the y direction. Accordingly, the surface is aspheric in the x-z plane and circular in the y-z plane. In a case of the configuration shown in FIG. 1, the light flux in the x-z plane is symmetrical to the z axis and the light flux in the y-z plane is asymmetrical to the z axis, and therefore the configuration in the y-z plane is more necessary to be corrected. Accordingly, in a case where the surface is a toroidal aspheric surface, the y toroidal aspheric surface is more effective. A designed example of the y toroidal aspheric surface is shown in Table 8. Compared with Table 7, the wave aberration of the light passing through the second region is further improved.

TABLE 8

|  |  | FIRST REGION | SECOND REGION | NOTE |
|---|---|---|---|---|
| WAVELENGTH | nm | 640 | 445 |  |
| CURVATURE RADIUS OF FIRST SURFACE | mm | 5.86626 | — |  |
| x |  | — | 6.09219 |  |
| y |  | — | 6.12124 |  |
| K |  | — | −4.790726 |  |
| A |  | — | −2.69431E−03 |  |
| B |  | — | 3.33164E−02 |  |
| C |  | — | −1.69479E−01 |  |
| D |  | — | 3.38567E−01 |  |
| AN INTERVAL OF CURVATURE CENTER POSITIONS | mm |  | 0.938104 | FIG. 11, SAME AS y DIRECTION, NO DEVIATION IN x, z DIRECTIONS |
| CURVATURE RADIUS OF SECOND SURFACE | mm |  | −8.19742 |  |
| SURFACE INTERVAL | mm | 1.5 | 1.5 | FIG. 11, SAME AS z DIRECTION |
| REFRACTIVE INDEX OF LENS |  | 1.506643 | 1.519219 |  |
| FOCAL LENGTH | mm | 7 | 7 |  |
| NUMERICAL APERTURE |  | 0.069 | 0.070 |  |
| INTERVAL OF LIGHT SOURCES (X) | mm |  | 0 | FIG. 11, x DIRECTION |
| INTERVAL OF LIGHT SOURCES (Y) | mm |  | 0.9 | FIG. 11, y DIRECTION |
| INTERVAL OF LIGHT SOURCES (Z) | mm |  | 0.04 | FIG. 11, z DIRECTION |

TABLE 8-continued

| | | FIRST REGION | SECOND REGION | NOTE |
|---|---|---|---|---|
| LIGHT-PATH FORMING ELEMENT | | | | |
| THICKNESS AT CENTER | mm | 1.1 | | |
| APEX ANGLE α | deg | 0.8 | | |
| COVER GLASS | | | | |
| THICKNESS | mm | | 0.25 | |
| MATERIAL | | | BK7 | |
| WAVE ABERRATION | λ(R.M.S) | 0.0081 | 0.0122 | |

An anamorphic aspheric surface is defined by the following equation (5).

$$z = \frac{CUXx^2 + CUYy^2}{\sqrt{1 + \{1 - (1+KX)CUX^2x^2 - (1+KY)CUX^2x^2\}} + AR\{(1-AP)x^2 + (1+AP)y^2\}^2 + BR\{(1-BP)x^2 + (1+BP)y^2\}^3 + CR\{(1-CP)x^2 + (1+CP)y^2\}^4 + DR\{(1-DP)x^2 + (1+DP)y^2\}^5} \quad (5)$$

In the equation (5),
CUX is a curvature in the x axis direction;
CUY is a curvature in the y axis direction;
KX is an x conic constant;
KY is a y conic constant;
AR is a factor of a rotational symmetry of a fourth order;
BR is a factor of a rotational symmetry of a sixth order;
CR is a factor of a rotational symmetry of an eighth order;
DR is a factor of a rotational symmetry of a tenth order;
AP is a factor of a rotational non-symmetry of a fourth order;
BP is a factor of a rotational non-symmetry of a sixth order;
CP is a factor of a rotational non-symmetry of an eighth order; and
DP is a factor of a rotational non-symmetry of a tenth order.
The aspheric surface is symmetrical to the x and y axis.
A designed example of an anamorphic aspheric surface is shown in Table 9. Compared with the designed example of the y toroidal surface shown in Table 8, the wave aberration of the light passing through the second region is further improved.

TABLE 9

| | | FIRST REGION | SECOND REGION | NOTE |
|---|---|---|---|---|
| WAVELENGTH | nm | 640 | 445 | |
| CURVATURE RADIUS OF FIRST SURFACE | mm | 5.86622 | — | |
| x | | — | 6.05253 | |
| y | | — | 6.12124 | |
| kx | | — | −1.392837 | |
| ky | | — | −9.057988 | |
| AR | | — | −3.87262E−04 | |
| BR | | — | 3.55503E−04 | |
| CR | | — | 5.58575E−02 | |
| DR | | — | −5.49469E−02 | |
| AP | | — | −1.90402E+00 | |
| BP | | — | 2.09910E+00 | |
| CP | | — | 2.18263E−02 | |
| DP | | — | 1.09523E−01 | |
| AN INTERVAL OF CURVATURE CENTER POSITIONS | mm | 0.938104 | | FIG. 11, SAME AS y DIRECTION, NO DEVIATION IN x, z DIRECTIONS |
| CURVATURE RADIUS OF SECOND SURFACE | mm | −8.19742 | | |
| SURFACE INTERVAL | mm | 1.5 | 1.5 | FIG. 11, SAME AS z DIRECTION |
| REFRACTIVE INDEX OF LENS | | 1.506643 | 1.519219 | |
| FOCAL LENGTH | mm | 7 | 7 | |
| NUMERICAL APERTURE | | 0.069 | 0.069 | |
| INTERVAL OF LIGHT SOURCES (X) | mm | 0 | | FIG. 11, x DIRECTION |
| INTERVAL OF LIGHT SOURCES (Y) | mm | 0.9 | | FIG. 11, y DIRECTION |
| INTERVAL OF LIGHT SOURCES (Z) | mm | 0.037 | | FIG. 11, z DIRECTION |

TABLE 9-continued

| | | FIRST REGION | SECOND REGION | NOTE |
|---|---|---|---|---|
| LIGHT-PATH FORMING ELEMENT | | | | |
| THICKNESS AT CENTER | mm | | 1.1 | |
| APEX ANGLE α | deg | | 0.8 | |
| COVER GLASS | | | | |
| THICKNESS | mm | | 0.25 | |
| MATERIAL | | | BK7 | |
| WAVE ABERRATION | λ(R.M.S) | 0.0081 | 0.0105 | |

As described above, the designed examples of the surface shapes such as the spherical surface, the aspheric surface, the toroidal surface, the toroidal aspheric surface, and the anamorphic surface are shown. The surface shape to be used can be determined in consideration of optical configuration, such as a focal length, an interval between light sources, a thickness and an apex angle of a wedge prism, a required wave aberration, and a processability of a lens, and the like.

A ninth embodiment of the present invention will be explained with reference to FIGS. 4 and 12 and Tables 10, 11, and 12.

The wavelength of the semiconductor laser varies due to the output level and temperature. When the wave length is changed, the refractive index of the material of the lens is changed so that the focal length is changed.

Moreover, even when the semiconductor lasers having the same wavelength are used, the wavelengths of the semiconductor lasers have variations. Regarding the lens of the focal length of 7 mm shown in Table 2, variations in the focused position of the light in a case where the light enters the wedge prism 13 shown in FIG. 3 from a side of the front surface 20 are calculated and shown in Table 10.

TABLE 10

| WAVELENGTH | nm | 640 | 660 | 445 | 465 |
|---|---|---|---|---|---|
| FOCUSED POSITION IN z DIRECTION | mm | 0 | 0.009 | 0 | 0.027 |

When the wavelength is changed by 20 nm, the focused position is changed by 9 μm for the red light, and 27 μm for the blue light. Considering the effect in the illuminating device, the degree of divergence and convergence of the formed light 19 shown in FIG. 3 is changed due to the change in the wavelength so that the light flux having a predetermined diameter cannot be emitted and therefore the resolution of the illumination is degraded.

Furthermore, since the degree of the divergence and convergence of the formed light is changed due to the change in the wavelength, color blurring occurs. In order to reduce the change in the focal length (focused position of the light) due to the variation in the wavelength, as shown in FIG. 12, the coupling lens is formed by a plurality of materials different from each other. The coupling lens may be formed by a plurality of materials each having different refractive index from each other. The same reference numbers are used for the same configurations or parts as those shown in FIG. 4. The first surface 5A such as the first region 6 and the second region 7 of the CL 5 is formed by a lens glass material 51 and the second surface of the CL 5 is formed by a lens glass material 52. In this example, the glass material 51 is F2 and the glass material 52 is BK7.

An example of the CL 5 designed by the configuration of the present embodiment is shown in Table 11. Deviations of the focused position of the light due to the variation or change in the wavelength of the lens according to the present example are shown in Table 12. Compared with the case where the CL 5 is formed by a single material, since the CL 5 is formed by the two type materials different from each other, the deviation in the focused position of the light can be reduced from 9 μm to 5 μm for the red light and from 27 μm to 9 μm in the case of change in the wavelength of 20 nm. In the designed example of Table 11, since the examples of the deviation in the focused position of the light are shown without taking care of the wave aberration in the design, the wave aberration of the light passing through the second region is a large value, such as 0.1078λ. When the surface is formed by an aspheric surface, a toroidal surface, or the like, the wave aberration can be reduced.

TABLE 11

| | | FIRST REGION | SECOND REGION | NOTE |
|---|---|---|---|---|
| WAVELENGTH | nm | 640 | 445 | |
| CURVATURE RADIUS OF FIRST SURFACE | mm | 6.5735 | 6.67912 | |
| CURVATURE RADIUS OF SECOND SURFACE | mm | | 3.27867 | FIG. 12, CURVATURE RADIUS OF CEMENTED SURFACE OF LENSES 51 AND 52 |
| CURVATURE RADIUS OF THIRD SURFACE | mm | | −9.28259 | FIG. 12, CURVATURE RADIUS OF LENS SURFACE 10 |
| AN INTERVAL OF CURVATURE CENTER POSITIONS | mm | | −6.04524 | |
| SURFACE INTERVAL 1 | mm | | 0.5 | FIG. 12, z DIRECTION, THICKNESS OF LENS 51 |
| SURFACE INTERVAL 2 | | | 1 | FIG. 12, z DIRECTION, THICKNESS OF LENS 52 |
| GLASS MATERIAL OF | | | F2 | FIG. 12, GLASS MATERIAL OF |

TABLE 11-continued

| | | FIRST REGION | SECOND REGION | NOTE |
|---|---|---|---|---|
| LENS 1 GLASS MATERIAL OF LENS 2 | | | BK7 | LENS 51 FIG. 12, GLASS MATERIAL OF LENS 52 |
| FOCAL LENGTH | mm | 7.00 | 7.00 | |
| NUMERICAL APERTURE | | 0.069 | 0.069 | |
| INTERVAL OF LIGHT SOURCES LIGHT-PATH FORMING ELEMENT | mm | | 0.91 | FIG. 12, y DIRECTION |
| THICKNESS AT CENTER | mm | | 1.1 | |
| APEX ANGLE α COVER GLASS | deg | | 0.8 | |
| THICKNESS | mm | | 0.25 | |
| MATERIAL | | | BK7 | |
| WAVE ABERRATION | λ(R.M.S) | 0.0047 | 0.1078 | |

TABLE 12

| WAVELENGTH | nm | 640 | 660 | 445 | 465 |
|---|---|---|---|---|---|
| FOCUSED POSITION IN z DIRECTION | mm | 0 | 0.005 | 0 | 0.009 |

A tenth embodiment of the present invention will be explained with reference to FIGS. 12 and 13.

A deviation amount of the focused position of the light due to the variation or change in the wavelength varies depending on the color of the light even when a changed amount of the wavelength is the same, as shown in the ninth embodiment. Moreover, the changed amounts or the variations of the wavelength due to an actual output level or temperature are also changed depending on the color of the light. When the first region 6 of the CL 5 is formed by the glass material 53 different from the glass material 54 of the second region 7 of the CL 5, or as shown in FIG. 14, the first and second regions are formed by the different glass materials 56, 57, respectively, the deviation in the focused position of the light due to the changes of the two wavelengths of the two semiconductor lasers can be reduced and the deviation amount can be almost matched with each other.

Next, an eleventh embodiment will be explained.

In a case where diameters of the light fluxes to be coupled are the same, when the focal length of the coupling lens is small, an amount of the light to be incorporated in the lens to be coupled is large so that the coupling efficiency can be increased.

If the coupling efficiency is increased, the light intensity of the light to be emitted can be decreased so that the heat generation in the light source can be prevented or suppressed.

FIG. 15 shows a relationship between an NA of the coupling lens and a coupling efficiency in a case where a divergence angle of the light source is in a condition of $\theta//=12$ (deg) and $\theta\perp=18$ (deg). When the NA is 0.1 or more, the coupling efficiency of 30% or more can be ensured.

When the diameter of the light to be coupled is Φ1 mm, the focal length of 5 mm or less is required to ensure the NA of 0.1 or more. Table 13 shows an example designed with the NA of 0.1, the focal length of 4.75 mm, and the diameter of the light flux of 0.96 mm. Both of the wave aberrations of the light passing through the first and second regions are sufficiently suppressed and the two light emitting points are at the same position in the x direction shown in FIG. 11.

TABLE 13

| | | FIRST REGION | SECOND REGION | NOTE |
|---|---|---|---|---|
| WAVELENGTH | nm | 640 | 445 | |
| CURVATURE RADIUS OF FIRST SURFACE | mm | 3.24552 | — | ASPHERIC SURFACE OF FIRST REGION OF FIRST SURFACE |
| x | | — | 3.36919 | ANAMORPHIC SURFACE OF SECOND REGION OF FIRST SURFACE |
| y | | — | 3.35912 | |
| k | | −1.826171 | — | |
| kx | | — | −3.767939 | |
| ky | | — | −11.662725 | |
| A | | −7.06E−03 | — | |
| B | | 9.71E−04 | — | |
| C | | −1.34E−04 | — | |
| D | | 5.85E−05 | — | |
| E | | −1.23E−03 | — | |
| F | | 8.79E−03 | — | |
| G | | −2.16E−02 | — | |
| H | | −1.16E−02 | — | |
| J | | 8.88E−02 | — | |
| AR | | — | −2.02078E−04 | |
| BR | | — | 5.31007E−02 | |
| CR | | — | −6.22584E−02 | |

TABLE 13-continued

| | | FIRST REGION | SECOND REGION | NOTE |
|---|---|---|---|---|
| DR | | — | -1.35541E-02 | |
| AP | | — | -3.22030E+00 | |
| BP | | — | 3.77610E-01 | |
| CP | | — | 4.26431E-01 | |
| DP | | — | -2.50411E-01 | |
| AN INTERVAL OF CURVATURE CENTER POSITIONS | mm | | 0.938104 | FIG. 11, SAME AS y DIRECTION, NO DEVIATION IN x, z DIRECTIONS |
| CURVATURE RADIUS OF SECOND SURFACE | mm | | -7.86284 | |
| SURFACE INTERVAL | mm | 1.5 | 1.5 | FIG. 11, SAME AS z DIRECTION |
| REFRACTIVE INDEX OF LENS | | 1.506643 | 1.519219 | |
| FOCAL LENGTH | mm | 4.75 | 4.75 | |
| NUMERICAL APERTURE | | 0.1 | 0.1 | |
| INTERVAL OF LIGHT SOURCES (X) | mm | | 0 | FIG. 11, x DIRECTION |
| INTERVAL OF LIGHT SOURCES (Y) | mm | | 0.9 | FIG. 11, y DIRECTION |
| INTERVAL OF LIGHT SOURCES (Z) | mm | | 0.00 | FIG. 11, z DIRECTION |
| LIGHT-PATH FORMING ELEMENT | | | | |
| THICKNESS AT CENTER | mm | | 1.1 | |
| APEX ANGLE α | deg | | 0.8 | |
| COVER GLASS | | | | |
| THICKNESS | mm | | 0.25 | |
| MATERIAL | | | BK7 | |
| WAVE ABERRATION | λ(R.M.S) | 0 | 0.0194 | |

Next, a twelfth embodiment of the present invention will be explained.

FIG. 16 shows a configuration of a projection type image display apparatus. The projection type image display apparatus may include the illuminating device according to an embodiment of the present invention, such as the above-described first to eleventh embodiments and may be a scanning type projector. The scanning type projector may further include a scanning device configured to two-dimensionally scan a surface to be scanned with light emitted from the illuminating device, and a control device configured to control outputs of the first and second light sources or the first to third light sources in synchronism with movement of the scanning device.

As an example, the scanning type projector using the illuminating device having three light sources shown in FIG. 6 will be explained. The same reference numbers are used for the same configurations or parts as those shown in FIG. 6. The scanning type projector shown in FIG. 16 further includes a scanning device 60 configured to two-dimensionally scan a surface to be scanned with the light emitted from the illuminating device and a control device 61 configured to control the scanning device 60 and the light sources of the illuminating device.

The control device 61 is configured to modulate the light source such that a desired image can be added in synchronism with the movement of the scanning device 60. The scanning device 60 is configured to swing or turn the reflection surfaces in a direction shown by an arrow 62 in FIG. 16 and to swing or turn the reflection surfaces about an axis 63 in a direction shown by an arrow 64 in FIG. 16.

Thereby, a two-dimensional projection image is formed on a screen 65 as the surface to be scanned As the scanning device, a galvano mirror, a polygon mirror and a MEMS mirror produced by using the semiconductor process technology may be used. Especially, the MEMS mirror is preferable for use in the small size projector because of its small size and low power consumption.

Although the mirror which is movable about two axes is shown in FIG. 16, two mirrors each of which is movable about one axis may be used.

FIG. 17 shows a configuration of the MEMS mirror, which can be used as another example of the scanning device. The MEMS mirror 90 has a structure in which a micro-mirror 91 is supported by torsion bars 92, 93. The micro-mirror 91 is configured to be resonantly-reciprocated substantially about an axis 94 by twisting the torsion bar 92. The micro-mirror 91 is also configured to be resonantly-reciprocated substantially about an axis 95 by twisting the torsion bar 93. By the resonant reciprocation about both axes 94, 95, a normal direction of a deflected surface of the micro-mirror 91 is two-dimensionally changed.

Thereby, a reflecting direction of the light flux, which enters the micro-mirror 91, is changed so that the surface to be scanned can be scanned with the light flux in two-dimensional directions.

According to the projection type image display apparatus having the above-described configurations by use of the small size micro-mirror of the light sources, a microminiaturization can be achieved.

Next, a thirteenth embodiment of the present invention will be explained.

FIG. 18 shows an example of an electronic device in which the microminiaturized projection type image display apparatus shown in the twelfth embodiment is built. FIG. 18 shows the example in which the projection type image display apparatus is disposed in a mobile phone 70. The projection type image display apparatus 71 according to an embodiment of the present invention is disposed in the mobile phone 70 and a screen is two-dimensionally scanned with an illumination light 72 to form an image. As the screen 73, a specific screen is not necessary to be prepared and a desk or a wall may be used as a screen.

Next, an example where the projection type image display apparatus is used for a head up display for a vehicle will be explained.

FIG. 19 is an explanatory view for explaining an example of the head up display device 300.

The head up display device 300 for a vehicle is provided in the vehicle and is configured to mainly include a projector 301, and a front window glass 302 configured to reflect projection light emitted from the projector 301.

The projector 301 is formed by the projection type image display apparatus according to an embodiment of the present invention, and configured to form a projection image at a predetermined position in an optical axis direction.

The projector 301 is positioned such that the front window glass 302 is disposed at a position in the optical axis direction and a driver 303 is positioned at a position in a reflecting direction of the front window glass 302.

In the front window glass 302, a partial reflection surface 302a configured to reflect a light flux emitted from the light source of the projector 301 is formed. On an inner surface of the partial reflection surface 302, a metal thin film, a dielectric multilayer or the like may be formed to improve a reflection ratio of each light flux from the light sources. The partial reflection surface 302a is transmissive for light from outside and configured to reflect the light flux emitted from the light source toward a position at a height of the eyes of the driver 303 on a driver's seat.

In the head up display device 300 for a vehicle, when the projector 301 is driven, the light fluxes emitted from the light sources are guided to the partial reflection surface 302a and then the light fluxes reflected on the partial reflection surface 302a are guided toward the eyes of the driver 303 on the driver's seat. At this time, a virtual image Vi of a projection image based on each light flux is formed on a front side of the front window glass 302 by the partial reflection surface 302a. Therefore, the projection image of each light flux reflected on the partial reflection surface 302a is displayed as the virtual image Vi to the driver 302.

Furthermore, in this embodiment of the present invention, although the head up display device 300 having the configuration where the projection image of the light fluxes reflected on the partial reflection surface 302a is focused on a retina at the position, as a virtual projection object, on the front side in a direction where the light fluxes emitted from the projector 301 are directed to the partial reflection surface 302a is described, it is not limited thereto and the head up display device for a vehicle using the projection type image display apparatus according to an embodiment of the present invention may be used.

For example, the configuration where the screen is disposed on an upper side of an instrument panel (dashboard), the projection image is projected on the screen by the projector 301, and the projection image projected on the screen is displayed to the driver 303 via the partial reflection surface 302a may be used.

In this case, the projection image projected on the screen is displayed as a virtual image at a front side of the front window glass 302.

Here, although the examples where the projection type image display apparatus is built in the mobile phone and the head up display for a vehicle are described, it may be built in a digital camera, a laptop computer, a PDA, and the like.

In addition, the projection type image display apparatus according to an embodiment of the present invention may be used in a writing optical system as shown in FIG. 20. A light flux is projected from the projection type image display apparatus 701 according to an embodiment of the present invention and reflected on a turning mirror 702 and a surface (photoreceptor) 703 to be scanned is scanned with the light reflected on the turning mirror 702 to form an image on the photoreceptor 703.

Reference number 704 indicates a scanning line. The photoreceptor 703 is rotated in a direction shown by an arrow 705, a two-dimensional image is formed on the photoreceptor 703 and then the image is transferred to paper, or the like. In a case where the projection type image display apparatus according to an embodiment of the present invention is used in a writing optical system, light fluxes from two or three light sources are set to have the same wavelength, and positions on the photoreceptor 703 to be illuminated by the two or three light sources are displaced to each other in a rotational direction of the photoreceptor 703 so that two or three scanning lines can be obtained at the same time, and therefore a high speed writing optical scanning system can be achieved.

Hereinafter, an embodiment of the coupling lens and the illuminating device in a case where the light source 14 described in FIG. 6 is developed as a semiconductor laser and the light sources 1, 2 and 14 are provided within one package will be explained.

FIG. 21 shows a configuration example in a case where the light source 14 shown in FIG. 6 is developed as a semiconductor laser and the light sources 1, 2, and 14 are provided on one package.

The illuminating device according to this embodiment includes a first light source 101 configured to emit first light of a first wavelength $\lambda 1$, a second light source 102 configured to emit second light of a second wavelength $\lambda 2$ and a third light source 103 configured to emit a third light of a third wavelength $\lambda 3$ and these light sources are mounted on one mount 104 in a state where the light sources are arranged adjacent to each other to form one package 105.

Light emitting directions of the first to third light sources 101, 102, 103 are substantially the same directions.

As the first light source 101, a semiconductor laser configured to emit light of a blue wavelength range (hereinafter, referred to as a blue LD), as the second light source 102, a semiconductor laser configured to emit light of a green wavelength range (hereinafter, referred to as a green LD), and as the third light source 103, a semiconductor laser configured to emit light of a red wavelength range (hereinafter, referred to as a red LD) may be used.

The blue wavelength range, the green wavelength range, and the red wavelength range are the wavelength range of 400 nm to 480 nm, 500 nm to 550 nm, and 600 nm to 700 nm, respectively. For example, the wavelength $\lambda 1$ of 445 nm may be used for the blue LD, the wavelength $\lambda 2$ of 530 nm may be used for the green LD, and the wavelength $\lambda 3$ of 640 nm may be used for the red LD.

In the following example, the above-described wavelengths are used. Here, although an example where the blue LD 101, the green LD 102, and the red LD 103 are formed on separate chips, respectively, and then mounted on one mount 105 is described, the blue LD 101, the green LD 102, and the red LD 103 may be formed on one chip.

Blue light 114 from the blue LD 101, green light 115 from the green LD 102, and red light 116 from the red LD 103 are coupled by a coupling optical system 106 (hereinafter, referred to as a CL) which is one coupling optical system, and then guided to a light-path forming element 117. FIG. 21 shows schematically a light path of each light.

As described above, the illuminating device is configured such that the light of the blue, red, green wavelength ranges is emitted on the same light path.

In the above-described examples, although the blue wavelength range is used for the first light source, the green wavelength range is used for the second light source, and the red wavelength range is used for the third light source, the wavelength ranges may be different from those used in the above examples. The light source configured to emit light by combining the light of three colors, that is, red, blue and green and then forming light may be preferably used and most useful because the light source can be used for the scanning type projector.

The light-path forming element 117 is a flat plate including a first reflection surface 118 configured to reflect the light of the red wavelength range and transmit the light of the blue and green wavelength ranges, a second reflection surface 120 configured to transmit the light of the blue wavelength range and reflect the light of the green wavelength range, and a third reflection surface 119 configured to reflect the light of the blue wavelength range. The light-path forming element 117 is in a form of a wedge shaped flat plate where the first and second reflection surfaces are inclined relative to each other at an angle β, and the second and third reflection surfaces are inclined relative to each other at an angle γ.

The red light 116 and the green light 115 enter the first reflection surface and are reflected on the first and second reflection surfaces, and then emitted, respectively. The blue light 114 enters the first and second reflection surfaces and is reflected on the third reflection surface and then emitted. The first and second reflection surfaces are configured to selectively reflect or transmit light depending on the wavelength of the light. Such a surface can be formed by optical multilayer films referred to as dichroic mirrors.

The CL 106 will be more specifically explained. The CL 106 has a first surface 106A at a side of the light sources and the first surface 106A has a first region 107 configured to transmit only the light of the first wavelength, a second region 108 configured to transmit only the light of the second wavelength, and a third region 109 configured to transmit only the light of the third wavelength.

A curvature center of a lens surface of the first region 107 is in a position shown by reference number 110, a curvature center of a lens surface of the second region 108 is in a position shown by reference number 111, and a curvature center of a lens surface of the third region 109 is in a position shown by reference number 112. The curvature centers of the lens surfaces of the three regions are in different positions from each other.

A second surface 106B of the CL, opposite to the first region 107, the second region 108, and the third region 109 is formed by a single surface. The function and effects of this configuration are the same as those of the above-described configurations.

As the configuration of the illuminating device, the curvature radiuses of the first, second and third regions of the coupling lens may be different from each other. The function and effects of this configuration are the same as those of the above-described configurations.

Lens thicknesses of the first, second and third regions of the coupling lens may be different from each other.

The curvature center of the second surface opposite to the first surface of the coupling lens and the curvature center of the first region of the first surface may be in a position on an optical axis of the first, second or third light source.

The light-path forming element may be a wedge-shaped combined prism having three reflection surfaces, such as a front surface, an intermediate surface, and rear surface in a wedge-shape combined prism. In addition, the light-path forming element may be configured such that light from the light source having an optical axis passing through the curvature center of the second surface opposite to the first surface and the curvature center of the first region of the first surface is reflected on the intermediate surface of the wedge prism, light passing through the second region of the first surface is reflected on the front surface of the wedge prism and light passing through the second region of the first surface is reflected on the rear surface of the wedge prism.

The wavelength of the light reflected on the front surface of the wedge prism may be in a range of 600 to 700 nm, the wavelength of the light reflected on the intermediate surface of the wedge prism may be in a range of 400 to 480 nm, and the wavelength of the light reflected on the rear surface of the wedge prism may be in a range of 500 to 550 nm.

The red light, which has the relatively wide change in the wavelength, is configured to be reflected on the front surface without refraction.

The first to third regions of the coupling lens are formed by an aspheric surface, a cylindrical surface, a toroidal surface, or an anamorphic aspheric surface.

In a case where the three light sources are incorporated in one package, since two light sources are not disposed on the optical axis of the second surface of the coupling lens, astigmatism is generated when passing through the coupling lens. Moreover, since two light fluxes are reflected at an inner side of the wedge prism, astigmatism is generated. That is, all of the three light fluxes have a factor of generating the astigmatism and therefore, in order to reduce the astigmatism, the first to third regions of the coupling lens are formed by one of the aspheric surface, the cylindrical surface, the toroidal surface, and the anamorphic aspheric surface.

The coupling lens is formed by a plurality of materials, which have refractive indices different from each other.

The first to third regions of the coupling lens are formed by materials which have different refractive indices from each other.

Each of the divided three regions of the coupling lens has an effective focal length of 5 mm or less.

Effect of the Invention

According to an embodiment of the present invention, one lens may be configured to have two regions and design can be optimized for each region, so that aberration in reflected light can be reduced for each light reflected on the front or rear surface of the light-path forming element such as the wedge prism.

At the same time, since one of the two regions can be configured to be reflected on the first and second surfaces of the coupling lens without decentering, a design for improving a lens performance can be easily made.

According to an embodiment of the present invention, a light path where astigmatism is not generated can be used. The configuration where the astigmatism generated by the decentering of the coupling lens and the astigmatism generated by the reflection on the rear surface of the light-path forming element such as the wedge prism are canceled with each other can be designed. Accordingly, wave aberration generated in the light passing through both of the first and second regions can be reduced.

According to an embodiment of the present invention, the following advantageous effects are also achieved.

Since the three color light can be formed and emitted, the full-color illuminating device can be provided.

Since focal lengths are optionally changed in the two regions, the coupling efficiency can be substantially the same, even when the degrees of the divergence are different from each other.

Since the focal length in each region is different from each other, the light emitting positions in the emitting direction from the light sources can be the same position.

The configuration where the angle change due to the refraction is not generated for the light of the wavelength range of 600 to 700 nm, which has wide change in the wavelength can be achieved.

The aberration generated by the decentering of the coupling lens and the aberration generated by the reflection on the rear surface of the wedge prism can be reduced.

The change in the focal length due to the change in the wavelength, which is generated by the change in the outputs of the light source or temperature can be suppressed, the diameter of the illumination light can be stable, and the decrease of the resolution of the image and generation of blurring can be suppressed.

The change in the focal length due to the change in the wavelength, which is generated by the change in the outputs of the light source and the temperature can be reduced by using an optimum glass material independently for each light path. In addition, the diameter of the illumination light can be stable, and the decrease of the resolution of the image and generation of blurring can be suppressed.

The coupling efficiency can be 30% or more so that emitting power of the light source can be reduced and the generation of heat can be suppressed.

The small size projection type image display apparatus can be achieved.

Data of a still image, a video image, or the like of an electronic device can be directly projected on the screen and therefore information can be easily shared with a plurality of people. In addition, the small size head up display for a vehicle or a high speed writing unit can be achieved.

The invention claimed is:

1. A coupling lens, for coupling first light having a first wavelength, which is emitted from a first light source with a second light having a second wavelength which is emitted from a second light source disposed adjacent to the first light source, the first and second lights being emitted in substantially the same direction, the coupling lens comprising:
   a first surface disposed so as to face the first and second light sources; the first surface including a first region through which the first light passes and a second region through which the second light passes, the first region having a first region curvature and the second region having a second region curvature; and
   a second surface disposed at an opposite side of the first surface and having a single second-surface curvature for the entire second surface,
   wherein a position of a first region curvature center of the first region curvature of the first region differs from a position of a second region curvature center of the second region curvature of the second region,
   wherein a second surface curvature center of the single second surface curvature of the entire second surface and the first region curvature center are disposed on an optical axis of the first or second light source,
   wherein the first region and the second region are together convex lenses,
   wherein a radius of the first region curvature differs from a radius of the second region curvature, and
   wherein the radius of the first region curvature is larger than the radius of the second region curvature, the first wavelength is longer than the second wavelength, the first light source is disposed behind the second light source along the direction in which the first and second lights are emitted, and a thickness of the second region is greater than a thickness of the first region.

2. The coupling lens according to claim 1, wherein a lens thickness of the first region differs from a lens thickness of the second region.

3. The coupling lens according to claim 1, wherein the coupling lens is formed by a plurality of materials each having different refractive index from each other.

4. The coupling lens according to claim 1, wherein a material of the first region differs from a material of the second region.

5. The coupling lens according to claim 1, wherein an effective focal length of each of the first and second regions is 5 mm or less.

6. An illuminating device comprising:
   a first light source configured to emit first light having a first wavelength;
   a second light source disposed adjacent to the first light source and configured to emit second light having a second wavelength, the first light and the second light being emitted in substantially the same direction; and
   a coupling lens configured to couple the first light with the second light, the coupling lens having a first surface facing the first and second light sources and a second surface disposed at an opposite side of the first surface and having a single second-surface curvature for the entire second surface,
   wherein the first surface includes a first region through which the first light passes and a second region through which the second light passes, the first region having a first region curvature and the second region having a second region curvature,
   wherein a position of a first region curvature center of the first region curvature of the first region differs from a position of a second region curvature center of the second region curvature of the second region,
   wherein a second surface curvature center of the single second surface curvature of the entire second surface and the first region curvature center are disposed on an optical axis of the first or second light source,
   wherein the first region and the second region are together convex lenses,
   wherein a radius of the first region curvature differs from a radius of the second region curvature, and
   wherein the radius of the first region curvature is larger than the radius of the second region curvature, the first wavelength is longer than the second wavelength, the first light source is disposed behind the second light source along the direction in which the first and second lights are emitted, and a thickness of the second region is greater than a thickness of the first region.

7. The illuminating device according to claim 6, further comprising a light-path forming element configured to match a light path of the first light with a light path of the second light, wherein the light-path forming element is a wedge prism.

8. The illuminating device according to claim 7, wherein light emitted from one of the first and second light sources, which passes through the first region curvature center of the first region of the first surface and the second surface curvature center, is configured to be reflected on a front surface of the wedge prism and light emitted from the other of the first and second light sources is configured to pass through the second region of the first surface and be reflected on a rear surface of the wedge prism.

9. The illuminating device according to claim 8, further comprising
- a third light source configured to emit third light having a third wavelength in a direction which differs from the emitted direction of the first and second light; and
- a secondary coupling lens configured to couple the third light,
- wherein the third light passing through the secondary coupling lens is configured to pass the wedge prism and a light path of the third light is configured to be matched with the light paths of the first and second light.

10. The illuminating device according to claim 8, wherein a lens thickness of the first region differs from a lens thickness of the second region.

11. The illuminating device according to claim 8, wherein the light reflected on the front surface of the wedge prism has a wavelength of 600 to 700 nm and the light reflected on the rear surface of the wedge prism has a wavelength of 400 to 480 nm.

12. The illuminating device according to claim 8, wherein the second region of the coupling lens is formed in an aspheric shape.

13. The illuminating device according to claim 8, wherein the second region of the coupling lens is formed by a cylindrical surface.

14. The illuminating device according to claim 8, wherein the second region of the coupling lens is formed by a toroidal surface.

15. The illuminating device according to claim 8, wherein the coupling lens is formed by a plurality of materials each having different refractive index from each other.

16. The illuminating device according to claim 8, wherein a material of the first region differs from a material of the second region.

17. The illuminating device according to claim 8, wherein an effective focal length of each of the first and second regions is 5 mm or less.

18. A projection image display apparatus comprising:
- illuminating device according to claim 6;
- a scanning device configured to two-dimensionally scan a surface to be scanned with light emitted from the illuminating device; and
- a control device configured to control outputs of the first and second light sources.

* * * * *